(12) United States Patent
Uchida et al.

(10) Patent No.: US 12,166,534 B2
(45) Date of Patent: Dec. 10, 2024

(54) ELECTRONIC APPARATUS FOR POSITION ESTIMATION OF WIRELESS DEVICE, ELECTRONIC SYSTEM, AND METHOD

(71) Applicant: KABUSHIKI KAISHA TOSHIBA, Tokyo (JP)

(72) Inventors: Daisuke Uchida, Kawasaki Kanagawa (JP); Takafumi Sakamoto, Tokyo (JP); Koji Akita, Yokohama Kanagawa (JP); Yuki Yonezawa, Ayase Kanagawa (JP); Yukako Tsutsumi, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 325 days.

(21) Appl. No.: 17/447,197

(22) Filed: Sep. 8, 2021

(65) Prior Publication Data

US 2022/0200711 A1 Jun. 23, 2022

(30) Foreign Application Priority Data

Dec. 22, 2020 (JP) .................. 2020-212402

(51) Int. Cl.
*H04B 17/309* (2015.01)
*H04W 64/00* (2009.01)

(52) U.S. Cl.
CPC .......... *H04B 17/309* (2015.01); *H04W 64/00* (2013.01)

(58) Field of Classification Search
CPC .............................. H04B 17/309; H04W 64/00
See application file for complete search history.

(56) References Cited

U.S. PATENT DOCUMENTS

| 10,182,306 | B2 | 1/2019 | Kanayama et al. |
| 2014/0003195 | A1* | 1/2014 | Vonog ....................... G01S 5/18 367/129 |
| 2014/0106776 | A1* | 4/2014 | Levin .................. H04W 64/006 455/456.1 |

FOREIGN PATENT DOCUMENTS

| JP | 2017-32469 A | 2/2017 |
| JP | 2020-94837 | 6/2020 |

* cited by examiner

*Primary Examiner* — Natasha W Cosme
(74) *Attorney, Agent, or Firm* — Finnegan, Henderson, Farabow, Garrett & Dunner, LLP

(57) ABSTRACT

According to one embodiment, an electronic apparatus includes a processor configured to estimate positions of a plurality of wireless devices from a plurality of position candidates based on position candidate information indicating the plurality of position candidates of the wireless devices, first communication information related to communication using a first electromagnetic wave between the plurality of wireless devices, and second communication information related to communication using a second electromagnetic wave between the plurality of wireless devices.

18 Claims, 41 Drawing Sheets

| | TRANSMISSION WIRELESS DEVICE ID | RECEPTION WIRELESS DEVICE ID | RECEPTION POWER | FREQUENCY CH | TRANSMISSION ANTENNA IDENTIFIER | RECEPTION ANTENNA IDENTIFIER |
|---|---|---|---|---|---|---|
| CHRONOLOGICAL ORDER ↓ | d1 | d2 | -50 dBm | 1 | 2021d1 | 2021d2 |
| | d1 | d2 | -30 dBm | 1 | 2021d1 | 2021d2 |
| | d1 | d2 | -33 dBm | 2 | 2021d1 | 2021d2 |
| | ⋮ | ⋮ | ⋮ | ⋮ | ⋮ | ⋮ |

FIG. 8

| | TRANSMISSION WIRELESS DEVICE ID | RECEPTION WIRELESS DEVICE ID | RECEPTION POWER | FREQUENCY CH | TRANSMISSION ANTENNA IDENTIFIER | RECEPTION ANTENNA IDENTIFIER |
|---|---|---|---|---|---|---|
| C1 | d1 ⋮ d1 | d2 ⋮ d2 | -50 dBm ⋮ -30 dBm | 1 ⋮ 1 | 2021d1 ⋮ 2021d1 | 2021d2 ⋮ 2021d2 |
| C2 | d1 ⋮ d1 | d2 ⋮ d2 | -43 dBm ⋮ -37 dBm | 1 ⋮ 1 | 2021d1 ⋮ 2021d1 | 2022d2 ⋮ 2022d2 |
| C3 | d1 ⋮ d1 | d2 ⋮ d2 | -48 dBm ⋮ -46 dBm | 2 ⋮ 2 | 2021d1 ⋮ 2021d1 | 2021d2 ⋮ 2021d2 |
| C4 | d1 ⋮ d1 | d2 ⋮ d2 | -33 dBm ⋮ -35 dBm | 2 ⋮ 2 | 2021d1 ⋮ 2021d1 | 2022d2 ⋮ 2022d2 |
| C5 | d1 ⋮ d1 | d2 ⋮ d2 | -53 dBm ⋮ -45 dBm | 1 ⋮ 1 | 2022d1 ⋮ 2022d1 | 2021d2 ⋮ 2021d2 |
| C6 | d1 ⋮ d1 | d2 ⋮ d2 | -43 dBm ⋮ -39 dBm | 1 ⋮ 1 | 2021d1 ⋮ 2022d1 | 2022d2 ⋮ 2022d2 |
| C7 | d1 ⋮ d1 | d2 ⋮ d2 | -47 dBm ⋮ -46 dBm | 2 ⋮ 2 | 2022d1 ⋮ 2022d1 | 2021d2 ⋮ 2021d2 |
| C8 | d1 ⋮ d1 | d2 ⋮ d2 | -31 dBm ⋮ -37 dBm | 2 ⋮ 2 | 2022d1 ⋮ 2022d1 | 2022d2 ⋮ 2022d2 |

FIG. 9

| | TRANSMISSION WIRELESS DEVICE ID | RECEPTION WIRELESS DEVICE ID | RECEPTION POWER | FREQUENCY CH | TRANSMISSION ANTENNA IDENTIFIER | RECEPTION ANTENNA IDENTIFIER |
|---|---|---|---|---|---|---|
| C13 | d1 | d2 | -30 dBm | 1 | 2021d1 | 2021d2 |
| | d1 | d2 | -46 dBm | 2 | 2021d1 | 2021d2 |
| C24 | d1 | d2 | -37 dBm | 1 | 2021d1 | 2022d2 |
| | d1 | d2 | -33 dBm | 2 | 2021d1 | 2022d2 |
| C57 | d1 | d2 | -45 dBm | 1 | 2022d1 | 2021d2 |
| | d1 | d2 | -46 dBm | 2 | 2022d1 | 2021d2 |
| C68 | d1 | d2 | -39 dBm | 1 | 2022d1 | 2022d2 |
| | d1 | d2 | -31 dBm | 2 | 2022d1 | 2022d2 |

FIG. 11

| | TRANSMISSION WIRELESS DEVICE ID | RECEPTION WIRELESS DEVICE ID | RECEPTION POWER | FREQUENCY CH | TRANSMISSION ANTENNA IDENTIFIER | RECEPTION ANTENNA IDENTIFIER |
|---|---|---|---|---|---|---|
| | d1 | d2 | -30 dBm | 1 | 2021d1 | 2021d2 |
| DETERMINATION | d1 | d2 | -33 dBm | 2 | 2021d1 | 2022d2 |
| | d1 | d2 | -45 dBm | 1 | 2022d1 | 2021d2 |
| | d1 | d2 | -31 dBm | 2 | 2022d1 | 2022d2 |

FIG. 12

WIRELESS DEVICE 200dX

| | TRANSMISSION WIRELESS DEVICE ID | RECEPTION POWER | FREQUENCY CH | TRANSMISSION ANTENNA IDENTIFIER | RECEPTION ANTENNA IDENTIFIER |
|---|---|---|---|---|---|
| CHRONOLOGICAL ORDER ↓ | d1 | -50 dBm | 1 | 2021d1 | 2021dX |
| | d1 | -30 dBm | 1 | 2021d1 | 2022dX |
| | d2 | -33 dBm | 2 | 2021d1 | 2022dX |
| | ⋮ | ⋮ | ⋮ | ⋮ | ⋮ |

FIG. 22

WIRELESS DEVICE 200dX

| | TRANSMISSION WIRELESS DEVICE ID | RECEPTION POWER | FREQUENCY CH |
|---|---|---|---|
| CHRONOLOGICAL ORDER ↓ | d1 | -50 dBm | 1 |
| | d1 | -30 dBm | 1 |
| | d2 | -33 dBm | 2 |
| | d1 | -32 dBm | 2 |
| | d3 | -43 dBm | 3 |
| | d5 | -23 dBm | 3 |
| | ⋮ | ⋮ | ⋮ |

FIG. 23

WIRELESS DEVICE 200dX

| | TRANSMISSION WIRELESS DEVICE ID | RECEPTION POWER |
|---|---|---|
| CHRONOLOGICAL ORDER ↓ | d1 | -50 dBm |
| | d1 | -30 dBm |
| | d2 | -33 dBm |
| | d1 | -32 dBm |
| | d3 | -43 dBm |
| | d5 | -23 dBm |
| | ⋮ | ⋮ |

FIG. 24

| | TRANSMISSION WIRELESS DEVICE ID | RECEPTION WIRELESS DEVICE ID | RECEPTION POWER | FREQUENCY CH |
|---|---|---|---|---|
| CHRONOLOGICAL ORDER ↓ | d1 | d2 | -50 dBm | 1 |
| | d1 | d2 | -30 dBm | 1 |
| | d1 | d2 | -33 dBm | 2 |
| | ⋮ | ⋮ | ⋮ | ⋮ |

FIG. 25

| TRANSMISSION WIRELESS DEVICE ID | RECEPTION WIRELESS DEVICE ID | RECEPTION POWER |
|---|---|---|
| d1 | d2 | -50 dBm |
| d1 | d2 | -30 dBm |
| d1 | d2 | -33 dBm |
| ⋮ | ⋮ | ⋮ |

CHRONOLOGICAL ORDER ↓

FIG. 26

WIRELESS DEVICE 200dX

| CHRONOLOGICAL ORDER | TRANSMISSION WIRELESS DEVICE ID | RECEPTION POWER | FREQUENCY CH | TRANSMISSION ANTENNA IDENTIFIER | RECEPTION ANTENNA IDENTIFIER |
|---|---|---|---|---|---|
| | ~~d1~~ | ~~-50 dBm~~ | ~~1~~ | ~~2021d1~~ | ~~2021dX~~ |
| | d1 | -30 dBm | 1 | 2021d1 | 2022dX |
| | d2 | -33 dBm | 2 | 2021d1 | 2022dX |
| | ⋮ | ⋮ | ⋮ | ⋮ | ⋮ |
| | d1 | -45 dBm | 1 | 2021d1 | 2021dX |
| | ⋮ | ⋮ | ⋮ | ⋮ | ⋮ |
| | ~~d1~~ | ~~-52 dBm~~ | ~~1~~ | ~~2021d1~~ | ~~2021dX~~ |
| | ⋮ | ⋮ | ⋮ | ⋮ | ⋮ |

FIG. 27

| ANTENNA | COMMUNICATION SYSTEM | RESULT OF GROUPING |
|---|---|---|
| ANTENNA 2021 (THE FIRST ELECTROMAGNETIC WAVE) | 300A | [(1 2) (3 4 5) *(7 8 9) (6 10 11)* (12 13 14) (15 16 17) (18 19 20) (21 22 23)] |
| | 300B | [(24 25) *(27 28 30) (26 29 31)* (32 33 34) *(38 39 41) (40 42 43)* (35 36 37) (44 45 46)]] |
| ANTENNA 2022 (THE SECOND ELECTROMAGNETIC WAVE) | 300A | [(1 2) (3 4 5) (6 7 8) (9 10 11) (12 13 14) (15 16 17) (21 22 23) (18 19 20)] |
| | 300B | [(24 25) (29 30 31) (26 27 28) (32 33 34) (35 36 37) (38 39 40) *(42 43 45) (41 44 46)* ]} |
| ANTENNA 2021 (THE THIRD ELECTROMAGNETIC WAVE) | 300A | [(1 2) *(3 4 6) (5 7 8)* (9 10 11) (12 13 14) (15 16 17) (21 22 23) (18 19 20)] |
| | 300B | [(24 25) (38 39 40) (41 42 43) (44 45 46) (35 36 37) (32 33 34) (29 30 31) (26 27 28)]]} |
| ANTENNA 2021, 2022, 2023 | 300A | [(1 2) (3 4 5) (6 7 8) (9 10 11) (12 13 14) (15 16 17) (21 22 23) (18 19 20) ] |
| | 300B | [(24 25) (26 27 28) (29 30 31) (32 33 34) (35 36 37) (38 39 40) (44 45 46) (41 42 43) ] |

FIG. 38

ELECTRONIC APPARATUS FOR POSITION ESTIMATION OF WIRELESS DEVICE, ELECTRONIC SYSTEM, AND METHOD

CROSS-REFERENCE TO RELATED APPLICATIONS

This application is based upon and claims the benefit of priority from Japanese Patent Application No. 2020-212402, filed on Dec. 22, 2020; the entire contents of which are incorporated herein by reference.

FIELD

Embodiments described herein relate generally to an electronic apparatus, an electronic system, and a method.

BACKGROUND

It is known to measure a propagation characteristic (for example, RSSI or the like) between a plurality of wireless devices and estimate a position of the plurality of wireless devices. Here, depending on a situation in which the plurality of wireless devices is placed, there is a possibility that the propagation characteristics vary and influence the estimation. To improve accuracy of estimation of the position of a plurality of wireless devices.

BRIEF DESCRIPTION OF THE DRAWINGS

FIG. 8 is a diagram illustrating an example of first communication information acquired regarding communication between a wireless device 200$d$1 and a wireless device 200$d$2.

FIG. 9 is a diagram illustrating the first communication information and second communication information classified by category in communication between the wireless devices 200$d$1 and 200$d$2.

FIG. 11 is a diagram illustrating a statistic S1 re-classified according to the antenna of the wireless device 200.

FIG. 12 is a diagram illustrating a statistic S2.

FIG. 22 is a diagram illustrating communication information in which a wireless device ID on a reception side is omitted in a wireless device 200$d$X.

FIG. 23 is a diagram illustrating communication information in which a transmission antenna identifier and a reception antenna identifier are further omitted from the case of FIG. 22.

FIG. 24 is a diagram illustrating communication information in which the frequency CH is further omitted from the case of FIG. 23.

FIG. 25 is a diagram illustrating communication information in which the transmission antenna identifier and the reception antenna identifier are omitted from the communication information of the first embodiment.

FIG. 26 is a diagram illustrating communication information in which the frequency CH is further omitted from the case of FIG. 25.

FIG. 27 is a diagram illustrating a case where a part of communication information is erased before the communication information is output.

FIG. 38 is a diagram illustrating results of grouping based on propagation data of the first electromagnetic wave to the third electromagnetic wave.

DETAILED DESCRIPTION

Figure 1:
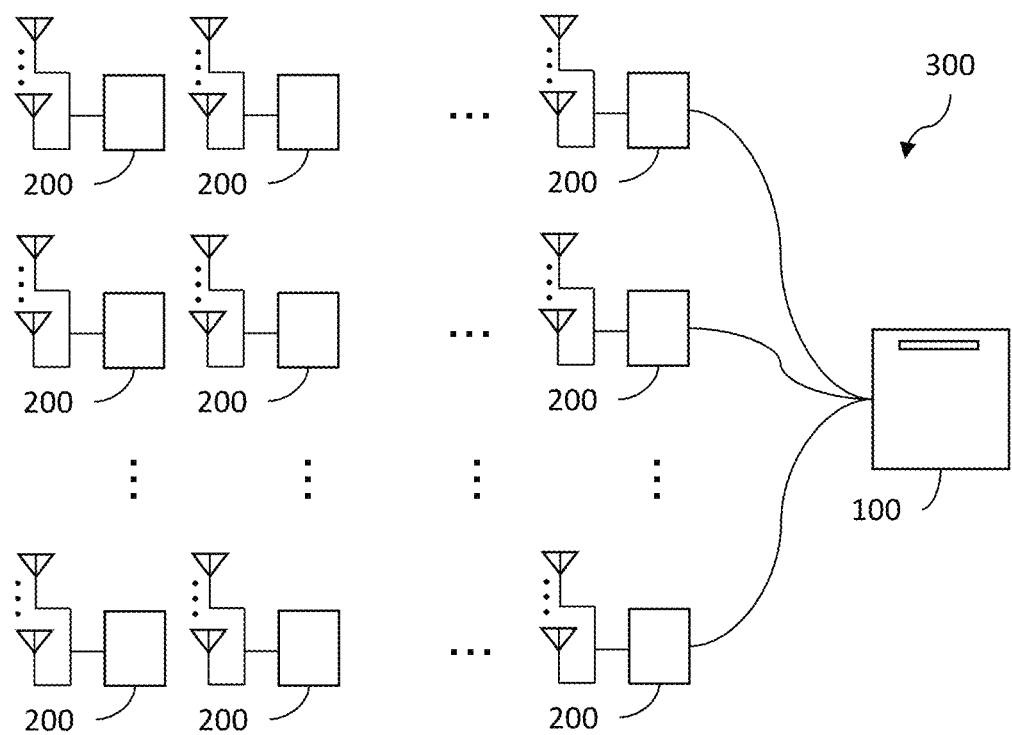
FIG. 1 is a schematic diagram of a communication system 300 according to a first embodiment.

According to one embodiment, an electronic apparatus includes a processor configured to estimate positions of a plurality of wireless devices from a plurality of position candidates based on position candidate information indicating the plurality of position candidates of the wireless devices, first communication information related to communication using a first electromagnetic wave between the plurality of wireless devices, and second communication information related to communication using a second electromagnetic wave between the plurality of wireless devices.

Hereinafter, embodiments of the present invention will be described in reference to the drawings. Disclosure is only an example, invention is not limited by the contents described in the following embodiments. In the drawings, the size, shape, and the like may be schematically represented to make the description more clear. In the multiple drawings, corresponding elements are denoted by the same reference numerals, and detailed description may be omitted.

First Embodiment

The first embodiment will be described. FIG. 1 illustrates a communication system 300 according to the first embodiment. The communication system 300 includes an estimation apparatus 100 and a plurality of wireless devices 200. The estimation apparatus 100 is a device that acquires information indicating candidates for positions of the wireless devices 200 (hereinafter also referred to as position candidates) and information regarding communication between the wireless devices 200 (hereinafter also referred to as communication information), and estimates at which position candidate each of the wireless devices 200 is placed. The information indicating the position candidates is also referred to as position candidate information. The estimation device 100 is also referred to as an electronic apparatus, and the communication system 300 is also referred to as an electronic system.

As an application example, in a case where the wireless device 200 is installed in/on a device such as a battery module, a lighting device, or an air-conditioner, the estimation apparatus 100 can estimate the position of the device in which the wireless device 200 is placed by estimating the position of the wireless device 200. FIG. 1 illustrates the communication system 300 in which the wireless devices 200 are placed in a grid pattern, the placement of the wireless devices 200 is not limited to this case. The estimation apparatus 100 and the wireless device 200 can perform communication between the estimation apparatus 100 and the wireless device 200, and between the plurality of wireless devices 200. The communication includes at least one of transmission of signals, reception of signals, or exchange required for communication. In FIG. 1, a case where the communication between the estimation apparatus 100 and the wireless device 200 is performed by wire and the communication between the wireless devices 200 and is performed by wireless, the connection of these communications may be wireless or wired. As the wireless communication standard, an arbitrary standard such as Wifi (registered trademark), Bluetooth (registered trademark), or UWB (Ultra Wide Band) can be applied.

When estimating the positions of the wireless devices 200, the estimation apparatus 100 acquires communication information by a plurality of electromagnetic waves between the wireless devices 200. For example, in a case where the wireless devices 200 performs communication using a first electromagnetic wave to a Nth electromagnetic wave (N is an integer equal to or greater than 2), the estimation apparatus 100 acquires first communication information related to communication of the first electromagnetic wave between the wireless devices 200, second communication information related to communication of the second electromagnetic wave between the wireless devices 200, . . . , and Nth communication information related to communication of the Nth electromagnetic wave between the wireless devices 200. The estimation apparatus 100 estimates the position of the wireless devices 200 from the position candidates based on the position candidate information and the first communication information to the Nth communication information. In the communication between the wireless devices 200, the propagation characteristics may deviate from the general tendency depending on the electromagnetic wave. Therefore, by using communication information between the wireless devices 200 using a plurality of electromagnetic waves, an accuracy of the estimation of positions of the wireless devices 200 can be improved.

Figure 2:
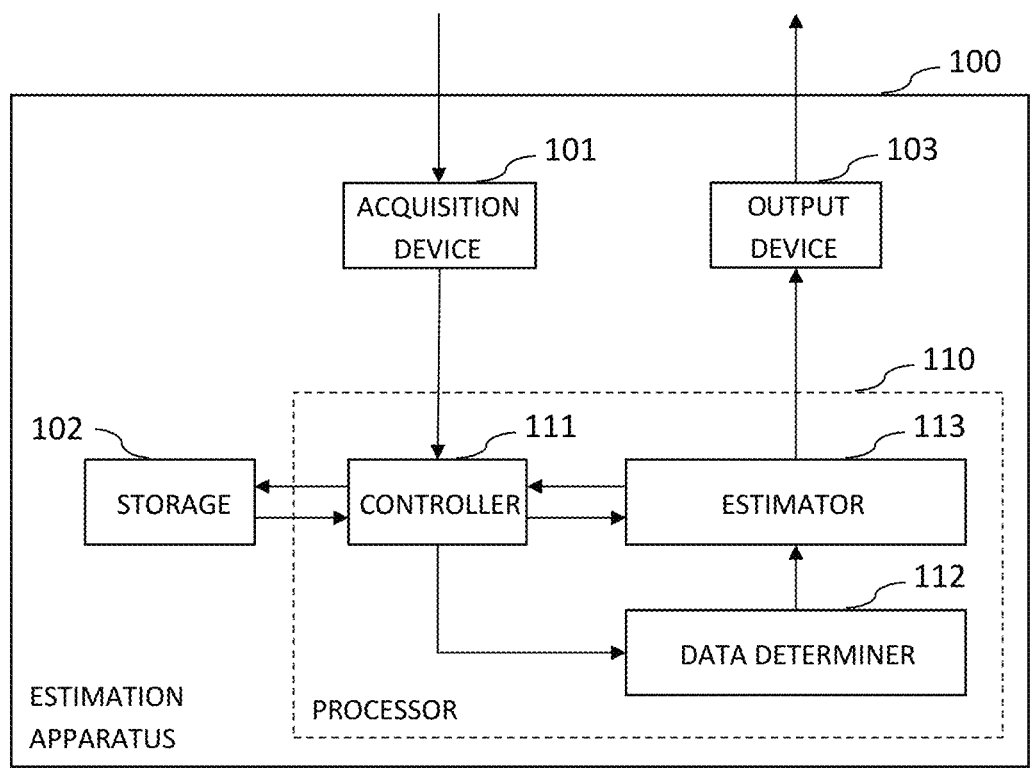
FIG. 2 is a configuration diagram of an estimation apparatus 100 according to the first embodiment.

FIG. 2 is a configuration diagram of the estimation apparatus 100. The estimation apparatus 100 includes an acquisition device 101, a processor 110, a storage 102, and an output device 103. The processor 110 includes a controller 111, a data determiner 112, and an estimator 113.

The acquisition device 101 acquires the position candidate information and the first communication information to the Nth communication information. The acquisition device 101 acquires these pieces of information by performing information processing on an input or an object. For example, the acquisition device 101 may acquire the position candidate information by an input from the user, may acquire the position candidate information by image processing or the like an input or a scanned drawing describing the position where the wireless devices 200 is placed, or may acquire the position candidate information by image processing or the like a photographed or an input image representing a placement state of the wireless devices 200. The acquisition device 101 acquires the first communication information to the Nth communication information from the wireless devices 200 by wired communication or wireless communication. The acquisition device 101 may acquire at least a part of the first communication information to the Nth communication information not directly from the wireless device 200 but via a collection device, a recording device, a database, or the like.

The communication information includes at least one of, for example, propagation data such as a received signal strength indicator (RSSI), a signal to noise ratio (SN ratio), and a packet error rate (PER) in communication between the plurality of wireless devices 200, identification information of the wireless device 200 in communication between the plurality of wireless devices 200 (hereinafter also referred to as wireless device identification information), identification information of an antenna used for communication by the wireless device 200 (hereinafter also referred to as antenna identification information), a signal reception time, and information indicating a frequency band used for communication (hereinafter also referred to as frequency information). The wireless device identification information is information for identifying each wireless device 200. The wireless device identification information is, for example, a MAC address or an IP address, but any information can be applied as long as each wireless device 200 can be identified. The antenna identification information is information for identifying antennas placed in the wireless devices 200, and any information can be applied as long as each antenna can be identified. The estimation apparatus 100 can identify each wireless device 200 and each antenna included in the communication system 300 by the wireless device identification information and the antenna identification information. The first communication information to the Nth communication information are sent to the data determiner 112, and the position candidate information is sent to the estimator 113.

The controller 111 causes the storage 102 to hold the position candidate information and the first communication information to the Nth communication information sent from the acquisition device 101, and sends at least one piece of information held in the storage 102 to the data determiner 112 and the estimator 113. In addition, the controller 111 may cause the storage 102 to hold information indicating the positions of the wireless devices 200 estimated by the estimator 113.

The storage 102 holds information sent from the controller 111. The storage 102 is a memory or the like, for example, a random access memory (RAM), a programmable ROM (PROM), an erasable PROM (EPROM), an electrically EPROM (EEPROM), a flash memory, a register, or the like. In addition, the storage 102 may be installed outside the estimation 100. When installed externally, the storage 102 may be a cloud that holds information via Internet.

The data determiner 112 determines statistics of the propagation data between the wireless devices 200 based on the first communication information to the Nth communication information sent from the controller 111. The propagation data include propagation data in the first electromagnetic wave to the Nth electromagnetic wave and in a plurality of frequency bands used for the communication between the wireless devices 200. By taking the statistics of the propagation data, it is possible to exclude an outlier of a propagation characteristic due to an electromagnetic wave or a frequency band. Examples of the statistics include a maximum value, a minimum value, an average value, and a median value. The determined statistics of the propagation data is sent to the estimator 113.

The estimator 113 estimates the positions of wireless devices 200 from the position candidates based on the position candidate information sent from the controller 111 and the statistics of the propagation data sent from the data determiner 112. The estimator 113 sends information indicating the estimated positions of the wireless devices 200 to the controller 111 and the output device 103.

The output device 103 outputs information indicating the estimated positions of wireless devices 200, which is sent from the estimator 113. Hereinafter, "output" may be also represented as "transmit". An output destination of the information indicating the estimated position of wireless devices 200 is predetermined. For example, any of an apparatus that analyzes the information indicating the estimated positions of wireless devices 200, an apparatus that visually displays the information, and an apparatus that holds the information can be applied. These devices may be elements (not shown) inside the estimation apparatus 100 or may be installed outside the estimation apparatus 100. The form of the information indicating the estimated position of wireless devices 200 is predetermined. For example, any of text data, image data, formatted data, and the like can be applied.

The configuration of the estimation apparatus 100 has been described above. In FIG. 2, the controller 111, the data determiner 112, and the estimator 113 are included in the processor 110. The processor 110 is one or more electronic circuits including a control device and an arithmetic device. The electronic circuit is realized by an analog or digital circuit or the like. For example, a general purpose processor, a central processor (CPU), a microprocessor, a digital signal processor (DSP), an ASIC, an FPGA, and combinations thereof can be applied. The functions of the processor 110 may be executed by these electronic circuits by software.

Figure 3:
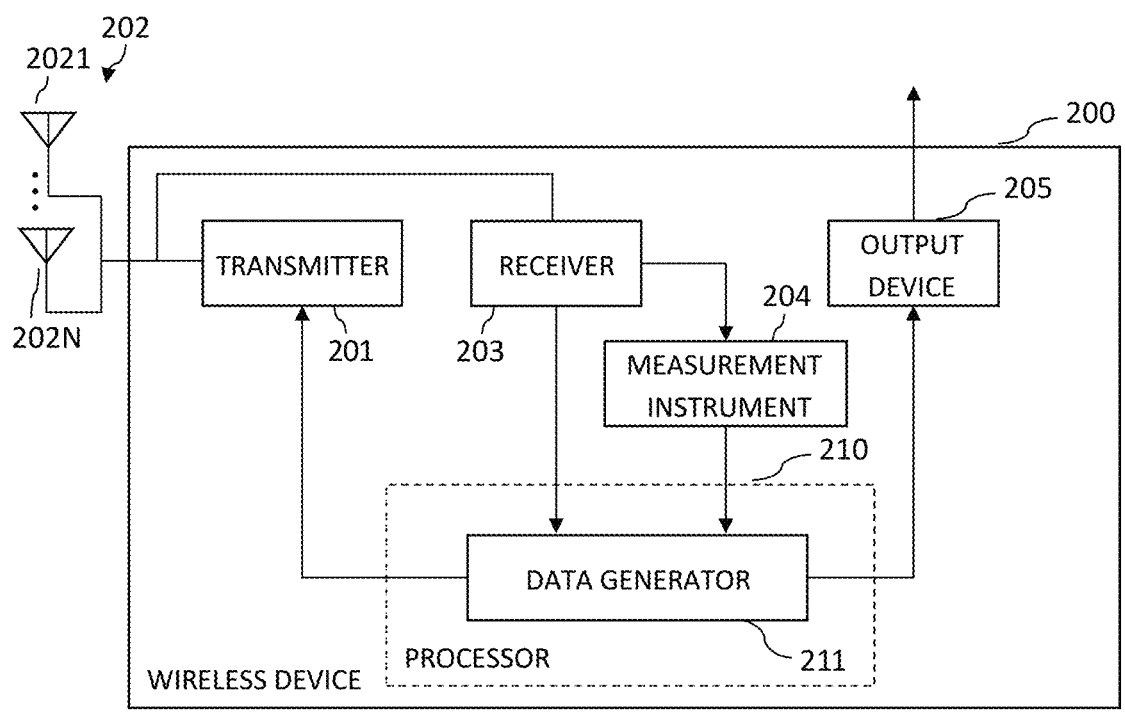
FIG. 3 is a configuration diagram of the wireless device 200 according to the first embodiment.

FIG. 3 is a configuration diagram of the wireless device 200. The wireless device 200 includes a transmitter 201, antennas 202, a receiver 202, a measurement instrument 204, a processor 210, and an output device 205. The antennas 202 is an array antenna including N antennas 2021, . . . , 202N. The processor 210 includes a data generator 211.

The transmitter 201 modulates a signal for measuring propagation data between the wireless device 200 of transmission destination and of transmission source (hereinafter also referred to as a transmission signal), and transmits the modulated signal via the antennas 202. The transmission signal includes wireless device identification information of the wireless device 200 of transmission source, antenna identification information of an antenna that radiates the transmission signal, and frequency information indicating a frequency band used for communication. A transmission form is predetermined, for example, in a transmission of the transmission signal, a wireless device 200 of transmission destination may be designated, the transmission may be performed by broadcast, or the transmission may be performed in synchronization with the wireless device 200 of transmission destination.

Figure 4:
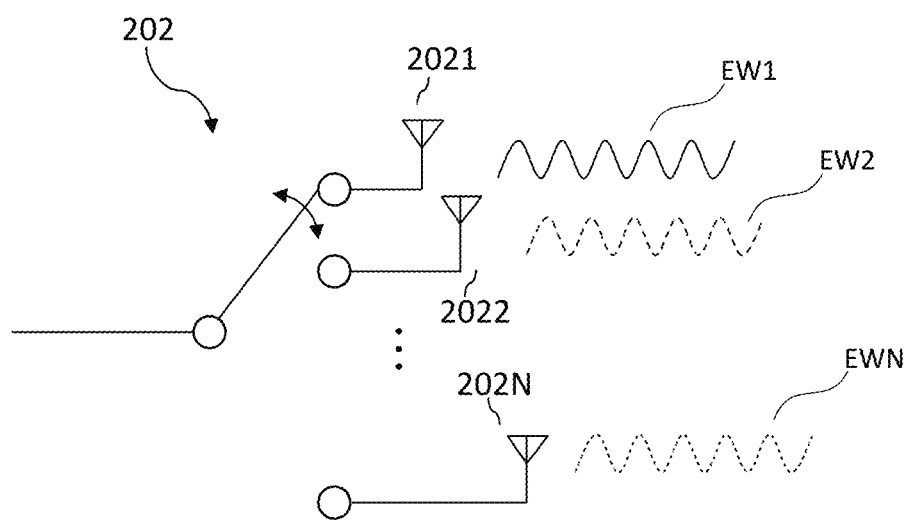
FIG. 4 is a diagram illustrating an electromagnetic wave radiated from each antenna.

The antennas 202 radiate the transmission signal sent from the transmitter 201. The antennas 202 is an array antenna including N antennas 2021, . . . , 202N. It is assumed that the electromagnetic wave radiated by the antennas 202 differs depending on each antenna. FIG. 4 is a diagram illustrating an electromagnetic wave radiated from each antenna. For example, the electromagnetic wave radiated by the antenna 2021 is a first electromagnetic wave (EW1), the electromagnetic wave radiated by the antenna 2022 is a second electromagnetic wave (EW2), . . . , and the electromagnetic wave radiated by the antenna 202N is a Nth electromagnetic wave (EWN). The antennas 202 radiate the first electromagnetic wave to the Nth electromagnetic wave at different times while changing connections of the antennas 2021 to 202N. These electromagnetic waves are treated as different electromagnetic waves even if the content of the transmission signal, the frequency band used for communication, or the wireless device 200 of transmission destination is same. This is because there is a possibility that the characteristics of the electromagnetic wave will differ if a radiating antenna differs.

The antennas 202 is also used for receiving a signal for measuring propagation data between the wireless device 200 and the wireless device 200 of the communication destination transmitted from the wireless device 200 of communication destination (hereinafter also referred to as a reception signal). The antennas 202 also receives the reception signal while switching antennas. Switching between the antennas 2021 to 202N for transmission and reception is predetermined. For example, switching at predetermined time interval, switching in synchronization with the communication destination wireless device 200, or the like can be applied.

The receiver 203 receives and demodulates the reception signal via the antennas 202. The reception signal includes at least one of the wireless device identification information, the antenna identification information, or the frequency information of the wireless device 200 of transmission source. The receiver 203 adds the wireless device identification information and the antenna identification information of a reception side (itself) to the reception signal and sends the reception signal to the data generator 211. The receiver 203 also sends the received signal to the measurement instrument 204.

The measurement instrument 204 measures propagation data from the reception signal sent from the receiver 203. The measured propagation data is sent to the data generator 211.

The data generator 211 associates the wireless device identification information, the antenna identification information of the wireless device 200 on a transmission side and a reception side, and the frequency information sent from the receiver 203 with the propagation data of the reception signal sent from the measurement instrument 204 to generate communication information. The data generator 211 sends the generated communication information to the output device 205. In addition, the data generator 211 generates the transmission signal and sends the transmission signal to the transmitter 201.

The output device 205 outputs the communication information sent from the data generator 211 to the estimation apparatus 100. For example, in a case where the wireless device 200 and the estimation apparatus 100 are connected by wire as illustrated in FIG. 1, the wireless device 200 outputs the communication information to the estimation apparatus 100 by wire. When the wireless device 200 and the estimation apparatus 100 are wirelessly connected, the output device 205 may be integrated with the transmitter 201 and output the communication information to the estimation apparatus 100 via the antennas 202.

The configuration of the wireless device 200 has been described above. In the communication system 300 of the present embodiment, it is assumed that the wireless device 200 includes at least the components described above. In FIG. 3, the measurement instrument 204 is not included in the processor 210, but may be included in the processor 210 depending on propagation data to be measured. For example, digital processing is required for measurement of propagation data. As the processor 210, a device similar to the device described in the processor 110 can be applied, and a function thereof may be executed by software.

Figure 5:
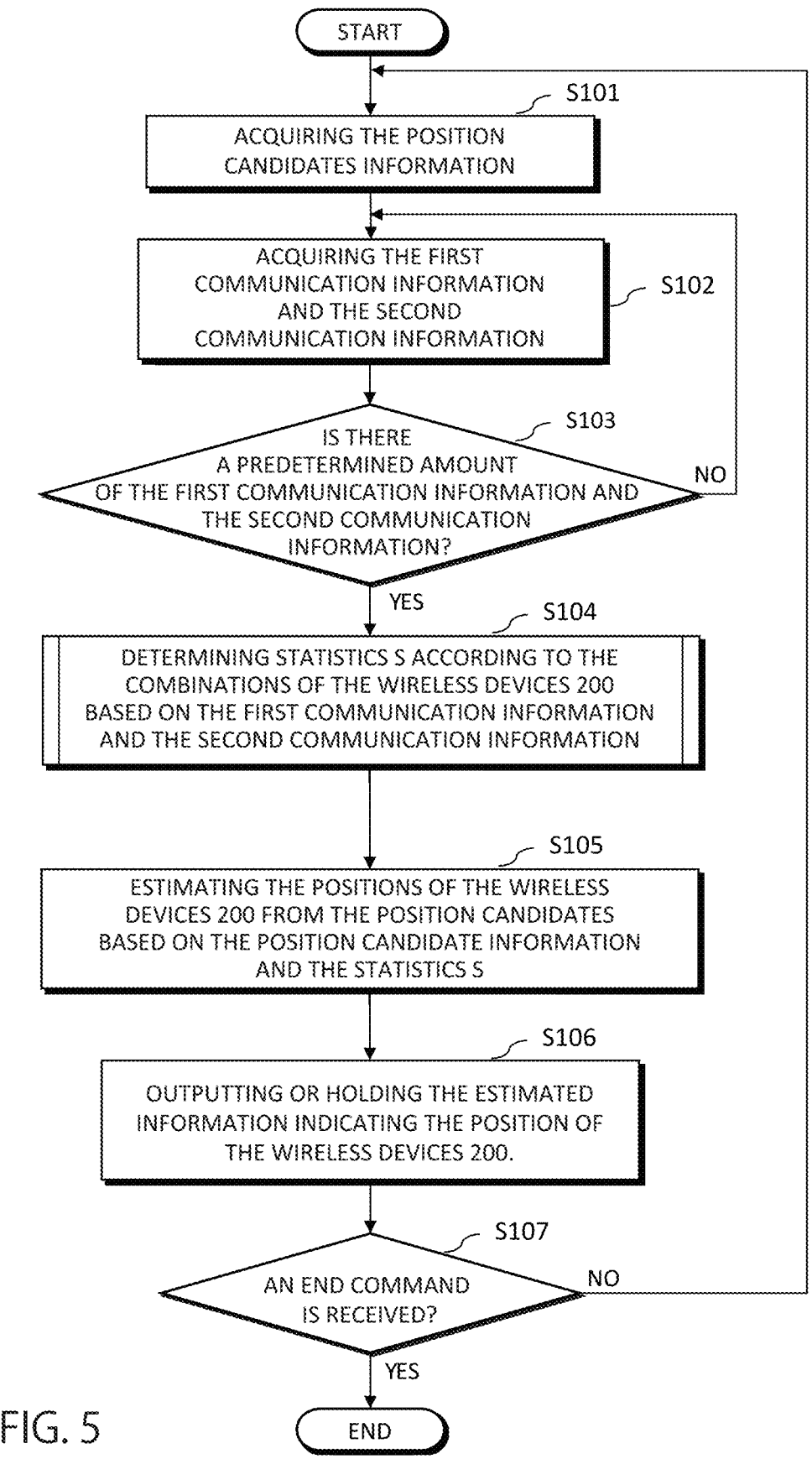
FIG. 5 is a flowchart of an estimation operation of the estimation apparatus 100 according to the first embodiment.

FIG. 5 is a flowchart of an estimation operation of the estimation apparatus 100. Hereinafter, the operation of the estimation apparatus 100 will be described in detail with reference to FIG. 5. It is assumed that exchange necessary for communication between the wireless devices 200 has already been completed. The estimation apparatus 100 identifies each of the wireless devices 200 and each of the antennas 2021 to 202N based on the wireless device identification information and the antenna identification information included in the communication information. In addition, as an example in the present embodiment, a case in which the propagation data is reception power of the reception signal (RSSI) will be described, and a case in which communication between the wireless devices 200 is performed using two electromagnetic waves (a first electromagnetic wave and a second electromagnetic wave) will be described. In this case, the wireless device 200 on a transmission side includes at least the antenna 2021 and the antenna 2022, and the first electromagnetic wave is radiated from the antenna 2021 and the second electromagnetic wave is radiated from the antenna 2022.

Figure 6:
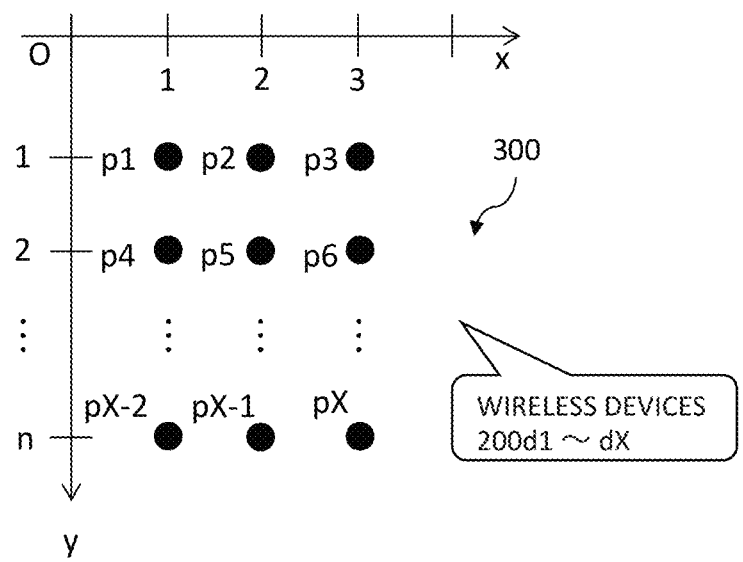
FIG. 6 is a diagram illustrating an example of position candidates of the communication system 300.

The acquisition device 101 acquires the position candidate information (step S101). FIG. 6 is a diagram illustrating an example of position candidates. It is assumed that the communication system 300 of the present embodiment includes X (X is a natural number of 2 or more) position candidates p1 to pX, and each of the wireless devices 200d1 to 200dX is placed in any one of the position candidates. Positions (coordinates) of the position candidates p1 to pX are clarified by the position candidate information. For example, in FIG. 6, each of the position candidates p1 to pX is specified by an x coordinate and a y coordinate. The position candidate p1 is expressed as (x, y)=(1, 1), the position candidate p2 is expressed as (x, y)=(2, 1), . . . , and the position candidate pX is expressed as (x, y)=(3, n) (n is a natural number). The estimation apparatus 100 recognizes that the wireless devices 200 include the wireless devices 200d1 to 200dX based on the wireless device identification information included in the communication information acquired later. At this point in time, the estimation apparatus 100 does not know the positions of the wireless devices 200d1 to 200dX in the position candidates. The acquired position candidate information is sent to the controller 111 and held in the storage 102 by the controller 111.

The acquisition device 101 acquires first communication information related to communication between the wireless devices 200 using the first electromagnetic wave and second communication information related to communication between the wireless devices 200 using the second electromagnetic wave (step S102). The first communication information and the second communication information are included in the communication information. The acquisition device 101 acquires the first communication information and the second communication information from the wireless device 200. Generation of the first communication information and the second communication information performed by each of the wireless devices 200 will be described below.

Figure 7:
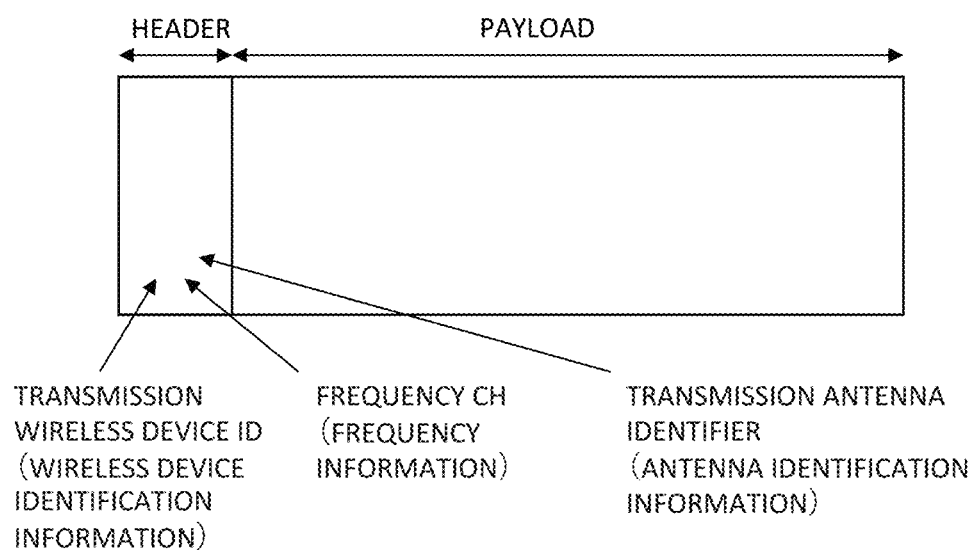
FIG. 7 is a diagram illustrating an example of a transmission signal.

The wireless device 200 on a transmission side modulates the transmission signal used for measurement of propagation data and sends the modulated signal using the antennas 2021 and 2022. FIG. 7 is a diagram illustrating an example of the transmission signal. In the transmission signal, a transmission wireless device ID as wireless device identification information of the wireless device 200 on the transmission side, a frequency CH (channel) as frequency information, and a transmission antenna identifier as antenna identification information of the wireless device 200 on the transmission side are incorporated in a header of the transmission signal. The transmission signal is transmitted using the first electromagnetic wave by the antenna 2021, and the transmission signal is transmitted using the second electromagnetic wave by the antenna 2022. It is also assumed that frequencies CH used for communication between the wireless devices 200 are frequencies CH1 and frequencies CH2.

The first electromagnetic wave and the second electromagnetic wave are received as reception signals by the wireless device 200 on a reception side and demodulated. The reception power of the received signal is measured as propagation data. The data generator 211 on the reception side associates the reception power of the reception signal with the reception wireless device ID as the wireless device identification information of the wireless device 200 on the reception side, the reception antenna identifier as the wireless device identification information of the wireless device 200 on the reception side, the transmission wireless device ID as the wireless device identification information of the wireless device 200 on the transmission side, the frequency CH, and the transmission antenna identifier as the wireless device identification information of the wireless device 200 on the transmission side included in the reception signal to generate a first communication information and a second communication information. The first communication information and the second communication information can be identified by the included transmission antenna identifier. The first communication information and the second communication information are output from the output unit 205 of the wireless device 200 on the reception side and acquired by the acquisition unit 101. Hereinafter, propagation data included in the first communication information is also referred to as first propagation data, and propagation data included in the second communication information is also referred to as second propagation data.

The first communication information and the second communication information acquired by the acquisition device 101 are sent to the controller 111, and the controller 111 causes the storage 102 to hold the first communication information and the second communication information. FIG. 8 is a diagram illustrating an example of first communication information acquired regarding communication between the wireless devices 200$d$1 and 200$d$2. In the first communication information, the transmission wireless device ID, the reception wireless device ID, the reception power of the reception signal, the frequency CH, the transmission antenna identifier, and the reception antenna identifier are converted into data and placed in chronological order. In FIG. 8, the reception power of the reception signal is expressed in decibels (dBm, the smaller the absolute value, the larger the reception power). Transmission antenna identifier 2021$d$1 means the antenna 2021 of the wireless device 200$d$1, and reception antenna identifier 2021$d$2 means the antenna 2021 of the wireless device 200$d$2. The second communication information is also converted into data in the same manner as the first communication information in FIG. 8 and held in the storage 102.

The controller 111 may classify the acquired the first communication information and the second communication information into a category based on at least one of the wireless device identification information of the wireless device 200 on the transmission side, the antenna identification information of the wireless device 200 on the transmission side, the wireless device identification information of the wireless device 200 on the reception side, the antenna identification information of the wireless device 200 on the reception side, or the frequency information. FIG. 9 is a diagram illustrating an example of the first communication information and the second communication information classified for each category in communication between the wireless devices 200$d$1 and 200$d$2. In FIG. 9, the first communication information and the second communication information are classified by frequencies CH1 or CH2, the transmission antenna identifiers 2021$d$1 or 2022$d$1, and the reception antenna identifiers 2021$d$2 or 2022$d$2 (eight ways). Each category is represented as C1 to C8. The reason why a plurality of pieces of data exist in the same category is that the wireless devices 200 repeatedly communicate with each other to generate propagation data. The controller 111 may cause the storage 102 to hold the classified first communication information and second communication information.

The controller 111 checks whether or not there is a predetermined amount of the first communication information and the second communication information held in the storage 102 (step S103). The type of the amount is predetermined. For example, a data capacity or the number of data can be applied. The amount is also predetermined. In this embodiment, the type and amount of data are set in advance in the controller 111, and the step S103 is checked. When the first communication information and the second communication information do not satisfy the predetermined amount (step S103: No), the process returns to step S102, and the acquisition of the first communication information and the second communication information is continued. Note that the step S103 and subsequent steps may be performed separately from the acquisition of the first communication information and the second communication information in the step S102 and the step S103 and subsequent steps may be performed at predetermined time intervals.

On the other hand, when the amount of the first communication information and the amount of the second communication information satisfy the predetermined amount (step S103: Yes), the controller 111 reads the first communication information and the second communication information from the storage 102 and sends the first communication information and the second communication information to the data determiner 112. The controller 111 reads the position candidate information from the storage 102 and sends the position candidate information to the estimator 113.

Figure 10:
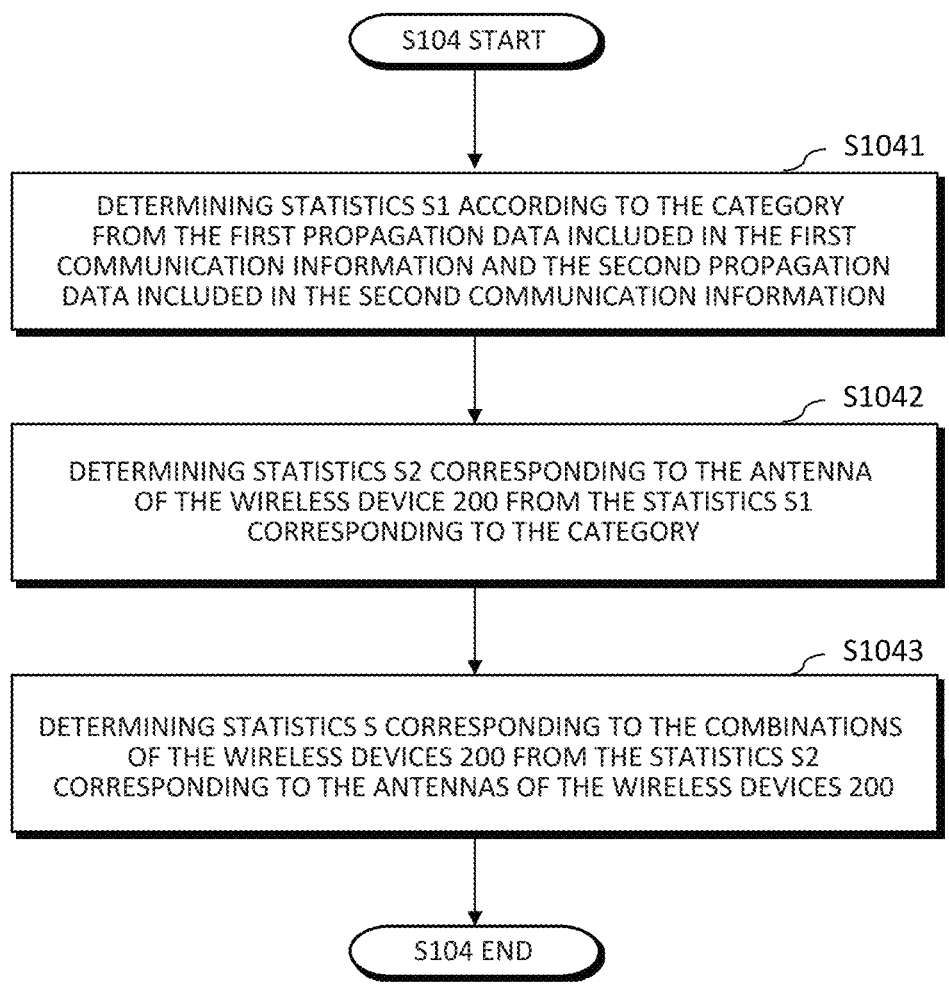
FIG. 10 is a flowchart illustrating step S104.

The data determiner 112 determines, based on the first communication information and the second communication information sent from the controller 111, statistics S according to the combinations of the wireless devices 200 (step S104). The statistic S is used to estimate the position of the wireless device 200. FIG. 10 is a flowchart explaining step S104. Hereinafter, details of step S104 will be described with reference to FIG. 10.

The data determiner 112 determines statistics S1 according to the category from the first propagation data included in the first communication information and the second propagation data included in the second communication information (step S1041). The data determiner 112 determines the statistics of the propagation data for each category classified as shown in FIG. 9. In the present embodiment, the data determiner 112 determines a maximum value of the reception power for each category. In the determination of the statistics, the data determiner 112 may determine an average value or a median value in addition to the maximum value. In addition, the data determiner 112 may select a type of statistic according to a type of propagation data. For example, the data determiner 112 may determine the maximum value when the propagation data is the signal-to-noise ratio, and may determine the minimum value instead of the maximum value when the propagation data is the error rate.

The data determiner 112 determines statistics S2 corresponding to the antenna of the wireless device 200 from the statistics S1 corresponding to the category (step S1042). FIG. 11 is a diagram illustrating the statistic S1 that is categorized according to the antenna of the wireless device 200 (statistic S2). In FIG. 11, the statistic S1 is classified into four types including the transmission antenna identifiers 2021$d$1 or 2022$d$1 and the reception antenna identifiers 2021$d$2 or 2022$d$2. The category C13 includes a statistic of the category C1 and a statistic of the category C3, the category C24 includes a statistic of the category C2 and a statistic of the category C4, the category C57 includes a statistic of the category C5 and a statistic of the category C7, and the category includes a statistic of the category and a statistic of the category the category C68 includes a statistic of the category C6 and a statistic of the category C8. The data determiner 112 determines statistics of the propagation data for each category classified according to the antenna of the wireless device 200. In the present embodiment, the data determiner 112 determines a maximum value of the reception power for each category.

The data determiner 112 determines statistics S corresponding to the combinations of the wireless devices 200 from the statistics S2 corresponding to the antennas of the wireless devices 200 (step S1043). FIG. 12 is a diagram illustrating the statistics S2 between the wireless devices 200$d$1 and 200$d$2. The data determiner 112 determines a statistic S corresponding to a combination of the wireless devices 200$d$1 and 200$d$2 from the statistics S2. In this embodiment, the data determiner 112 determines a maximum value of the reception power. In FIG. 12, the maximum value of the reception power is −30 dBm, and this value is determined as the reception power of the communication between the wireless devices 200$d$1 and 200$d$2, and is used to estimate the positions of the wireless devices 200$d$1 200$d$2. The data determiner 112 sends the determined statistic S to the estimator 113.

Figure 13:
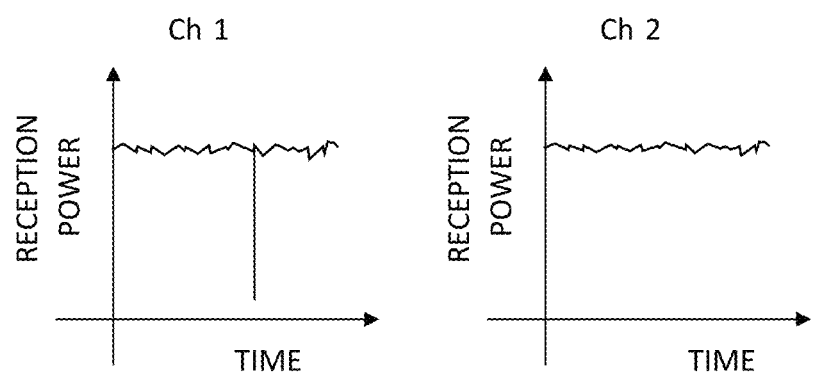
FIG. 13 is a diagram illustrating an example of reception power for each frequency CH.
Figure 14:
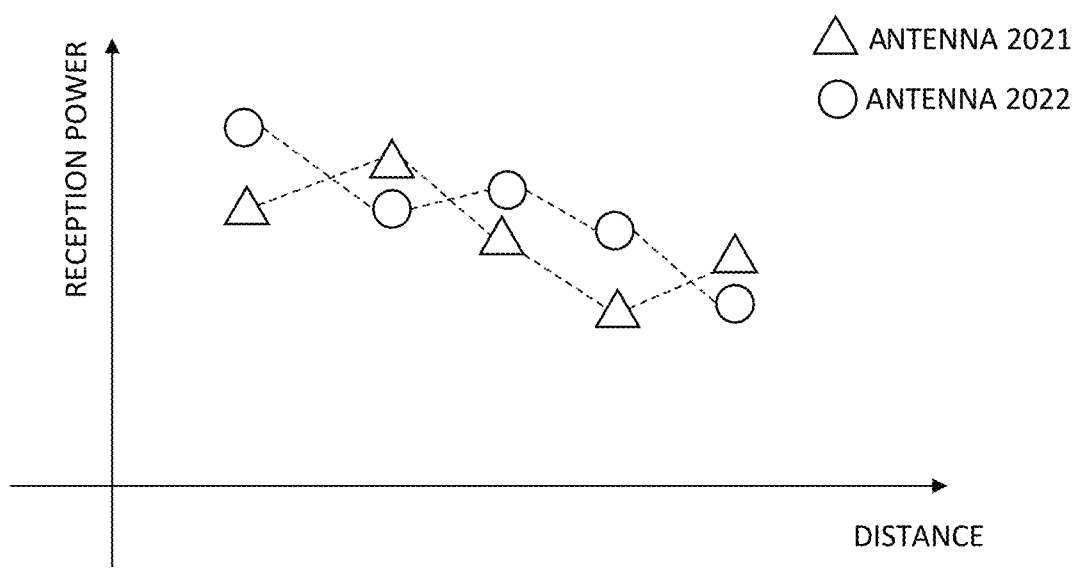
FIG. 14 is a diagram illustrating an example of reception power for each antenna.

The reason why the data determiner 112 determines the statistics S1, S2 of the propagation data for each category is that the influence of the outlier propagation data can be reduced. For example, FIG. 13 is a diagram illustrating an example of reception power for each frequency CH. Normally, there is no significant difference in the level of the reception power for each of the frequency CH, but depending on a frequency, the reception power may decrease rapidly at a certain time. In FIG. 13, the reception power rapidly decreases at a certain time (outlier) in the CH1 of the frequencies. Without measuring propagation data and determining statistics at multiple frequencies CH, this outlier may affect the accuracy of the estimate of the positions of wireless devices 200. FIG. 14 is a diagram illustrating an example of reception power for each antenna. Normally, a reception power decreases as a distance between the wireless device 200 on the transmission side and the wireless device 200 on the reception side increases. However, as in this example, the reception power may increase even though the distance between the wireless devices 200 increases in both the antenna 2021 and the antenna 2022. By measuring propagation data of a plurality of antennas (electromagnetic waves) and determining statistics, it is possible to maintain a general tendency in which reception power decreases as the distance between wireless devices 200 increases. Accordingly, the accuracy of the estimation of the position of the wireless device 200 can be improved.

A part of the determination of the statistics for each category described in the present embodiment may be omitted. For example, the data determiner 112 may determine the statistic S after the statistic S1, or may be determine the statistic S2 without determining the statistic S1.

FIGS. 8 to 12, the determination of the statistic S in the communication of the wireless devices 200$d$1 and 200$d$2 have been described as an example. Thereafter, in the same manner, the data determiner 112 determines the statistics S for each combination from the wireless devices 200$d$1 to 200$d$X, and sends the statistics S to the estimator 113.

The determination of the statistics S according to the combinations of the wireless devices 200 (step S104) has been described above. Referring back to FIG. 5, the estimator 113 estimates the positions of the wireless devices 200 from the position candidates based on the position candidate information sent from the controller 111 and the statistics S sent from the data determiner 112 (step S105).

Figure 15:
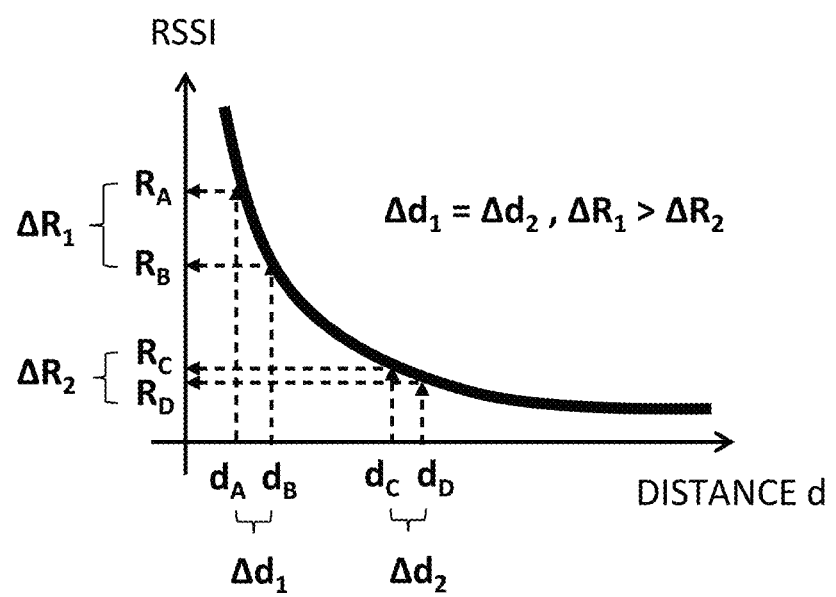
FIG. 15 is a diagram illustrating a relationship between reception power and actual distance.

In estimating the position of the wireless devices 200, a relationship between the reception power and the distance is used. FIG. 15 is a diagram illustrating the relationship between the reception power and the actual distance. The reception power between the plurality of wireless devices 200 attenuates in exponentiation of the actual distance. For example, in free space, the reception power attenuates in proportion to the square of the distance. Even if the difference in distance is same level, the difference in reception power corresponding to the difference in distance is not constant. FIG. 15 illustrates an example that the reception power corresponding to a distance from the wireless device 200 on the transmission side. It is assumed that the reception power is RA at the distance dA, the reception power is RB at the distance dB, the reception power is RC at the distance dC, the reception power is RD at the distance dD. The difference Δd1 between the distances dA and dB is equal to the difference Δd2 between the distances dC and dD. However, in the difference ΔR1 between RA and RB and the difference ΔR2 between RC and RD, ΔR2 is smaller than ΔR1. Thus, the farther away from the wireless device 200 on the transmission side, the smaller the change in the measured reception power.

The estimator 113 generates a plurality of combinations in which the wireless devices 200$d$1 to 200$d$X are tentatively placed in the position candidates p1 to pX (hereinafter, also referred to as hypotheses). The estimator 113 calculates an evaluated value for each hypothesis, and estimates a combination most appropriate as the placement of the wireless devices 200$d$1 to 200$d$X as the position of the wireless devices 200.

As an example of the evaluated value in the hypothesis, the estimator 113 obtains distances from the wireless devices 200$d$1 to 200$d$X for each hypothesis, and calculates the evaluated value for each hypothesis using a correlation between the obtained distances and the reception power is used. Since the reception power between the two wireless devices 200 has a strong correlation with the distance described in FIG. 15, the distance between the two wireless devices 200 is closer as the reception power increases. Therefore, the estimator 113 evaluates whether the reception power increases as the distances of the wireless devices 200$d$1 to 200$d$X in the hypothesis decrease. For example, the estimator 113 estimates, as the position of the wireless devices 200, a combination in which a correlation between the distances of the wireless devices 200$d$1 to 200$d$X in the hypothesis and the reception power is closest to −1. The estimator 113 may obtain the distances from the wireless devices 200$d$1 to 200$d$X for each hypothesis as the evaluated value, and may obtain the contradiction based on the obtained distances and the reception power. In this case, the estimator 113 estimates the combinations having the smallest contradiction as the position of the wireless devices 200.

Figure 16:
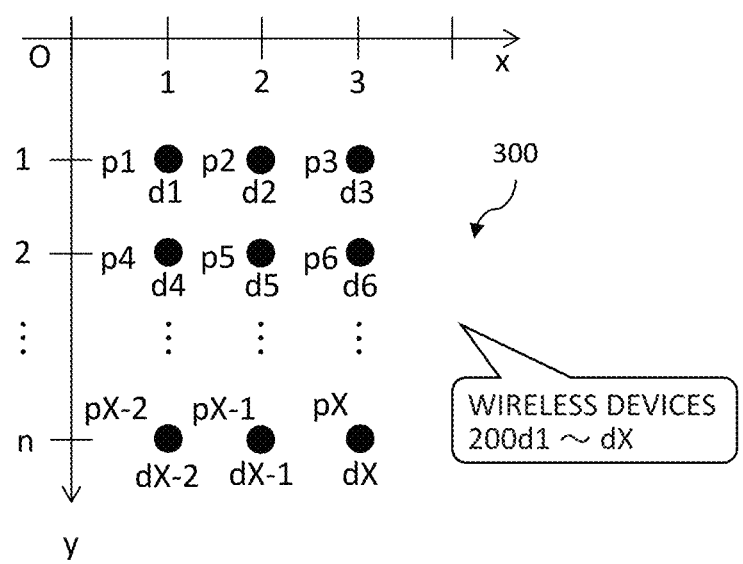
FIG. 16 is a diagram illustrating an example of the positions of the wireless devices 200 estimated by the estimator 113 in the first embodiment.

FIG. 16 is a diagram illustrating an example of the estimated positions of the wireless devices 200 by the estimator 113. As an example of the present embodiment, the estimator 113 estimates that the wireless device 200$d$1 is placed at the position candidate p1, the wireless device 200$d$2 is placed at the position candidate p2, . . . , and the wireless device 200$d$X is placed at the position candidate pX. The estimator 113 sends information indicating the estimated positions of the wireless devices 200 to the output device 103.

The controller 111 checks whether or not an end command for ending the operation of the estimation apparatus 100 has arrived (step S107). This end command is a command to end the operation of the estimation apparatus 100 in this flow. The end command is input to the estimation apparatus 100 by the user, the estimation apparatus 100 acquires a signal including the end command, or the like, and is sent to the controller 111. The end command may be a command to immediately end the operation of the estimation apparatus 100.

When the end command has not arrived at the controller 111 (step S107: No), the process returns to step S101. When the position candidate information is not changed, the process may return to step S102. On the other hand, when the end command has arrived at the controller 111 (step S107: Yes), the flow ends, and the estimation apparatus 100 ends the operation. After returning to step S101 or S102, the estimation apparatus 100 may perform the operation of this flow again under a predetermined condition. When the flow returns, the controller 111 may delete a part of the first communication information and the second communication information, or delete the first communication information and the second communication information used for estimating the positions of the wireless devices 200 a predetermined number of times (for example, once) from the storage 102.

The estimation apparatus 100 according to the present embodiment has been described above. The estimation apparatus 100 described in the present embodiment is an example, and various modifications can be implemented and executed. Hereinafter, a modified example of the communication system 300 including the estimation apparatus 100 will be described.

(Modification 1)

Figure 17:
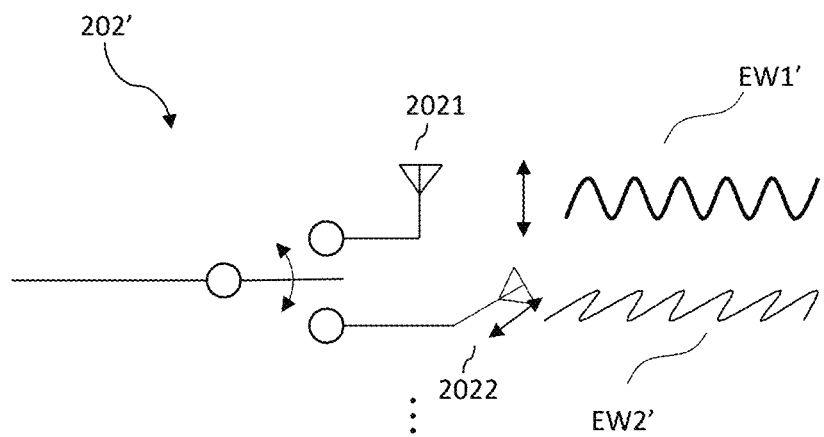
FIG. 17 is a diagram illustrating a case where polarized waves are used as electromagnetic waves.

In this modification, a modification of the electromagnetic wave radiated by the antennas 202 will be described. FIG. 17 is a diagram illustrating a case where polarized waves are used as electromagnetic waves. In FIG. 17, a vertically polarized wave EW1' is radiated from the antenna 2021 as a first electromagnetic wave, and a horizontally polarized wave EW2' is radiated from the antenna 2022 as a second electromagnetic wave. If the electromagnetic waves have different planes of polarization, there is a high possibility that a place (indicating a time zone, a frequency band, a reception antenna, or the like) where an outlier of propagation data due to the electromagnetic waves occurs is different. In this case, the influence of the outlier can be reduced by determining the statistics S as in the present embodiment. Electromagnetic waves whose polarization planes are orthogonal to each other, such as vertically polarized waves EW1' and horizontally polarized waves EW2', may be used. The relationship between the polarized waves is not limited to that the planes of polarization are orthogonal, and a plurality of polarized waves having different planes of polarization may be used as the first electromagnetic wave to the Nth electromagnetic wave.

Figure 18:
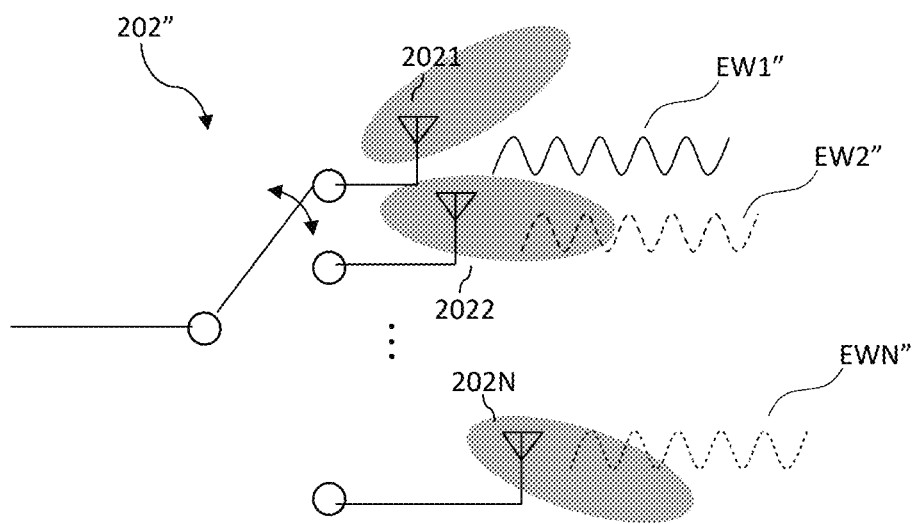
FIG. 18 is a diagram illustrating a case where a directivity (directivity direction) of electromagnetic waves radiated by antennas 2021 to 202N is different.

FIG. 18 is a diagram illustrating a case where the directivity (directivity direction) of the electromagnetic waves radiated by the antennas 2021 to 202N is different. The electromagnetic wave EW1" radiated by the antenna 2021, the electromagnetic wave EW2" radiated by the antenna 2022, . . . , and the electromagnetic wave EWN" radiated by the antenna 202N have different directivities. By using electromagnetic waves having different directivities, there is a high possibility that the places where the outliers of the propagation data due to the electromagnetic waves occur are different. and the influence of the outliers can be reduced. in this case, the influence of the outlier can be reduced by determining the statistics S as in the present embodiment.

(Modification 2)

Figure 19:
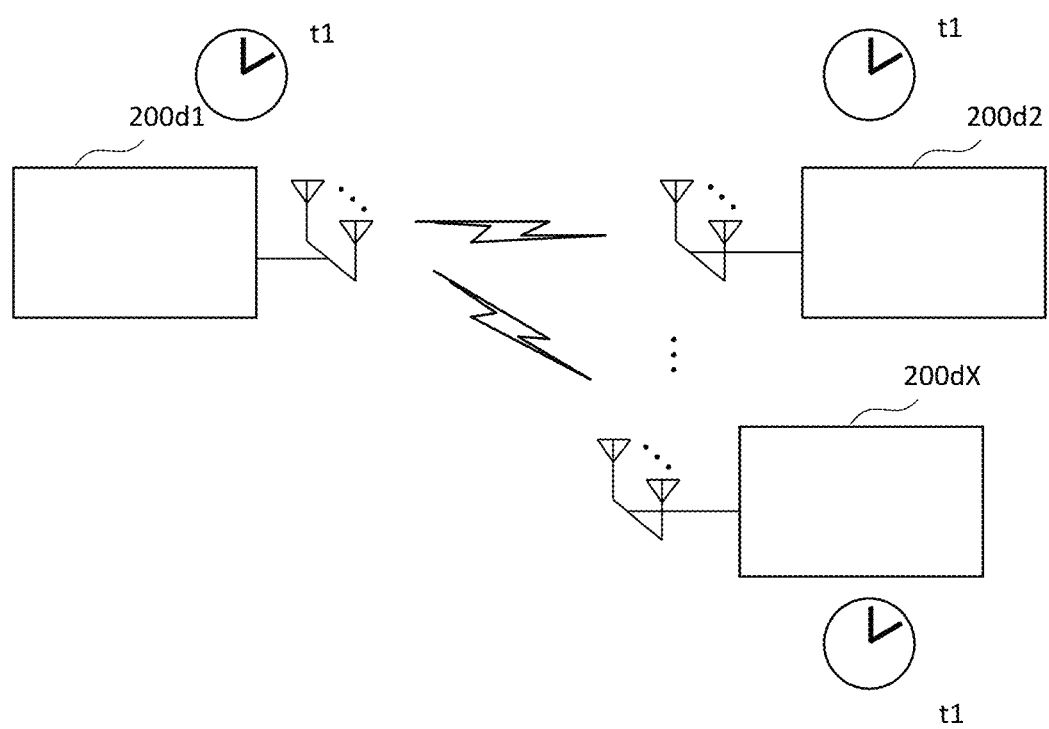
FIG. 19 is a diagram for explaining time synchronization in communication of the wireless devices 200.

In this modification, a modification of transmission of the transmission signal by the wireless device 200 on the transmission side and reception of the reception signal by the wireless device 200 on the reception side will be described. FIG. 19 is a diagram illustrating time synchronization in communication of the wireless devices 200. The time synchronization is performed by transmitting a preamble from a wireless device 200 serving as a reference to other wireless devices 200 and receiving the preamble by the other wireless devices 200. In FIG. 19, the wireless device 200$d1$ broadcasts the preamble to the wireless devices 200$d2$ to 200$dX$ at time t1. By receiving the preamble, the time of the wireless device 200$d1$ can be synchronized with the time of the wireless devices 200$d2$ to 200$dX$. In FIG. 19, the times of the wireless devices 200$d1$ to 200$dX$ are synchronized with t1.

In the case where switching from the first electromagnetic wave to the Nth electromagnetic wave radiated by the wireless device 200$d1$ (switching from the transmission antennas 2021$d1$ to 202N$d1$) and switching from the antennas 2021 to the 202N of the wireless device 200 on the reception side are performed in accordance with time, some information can be omitted from the first communication information to the Nth communication information. This is because it is possible to identify the combinations of the antennas 202 on the transmission side and the antennas 202 on the reception side can be identified by referring to the reception time of the reception signal included in the first communication information to the Nth communication information.

Figure 20:
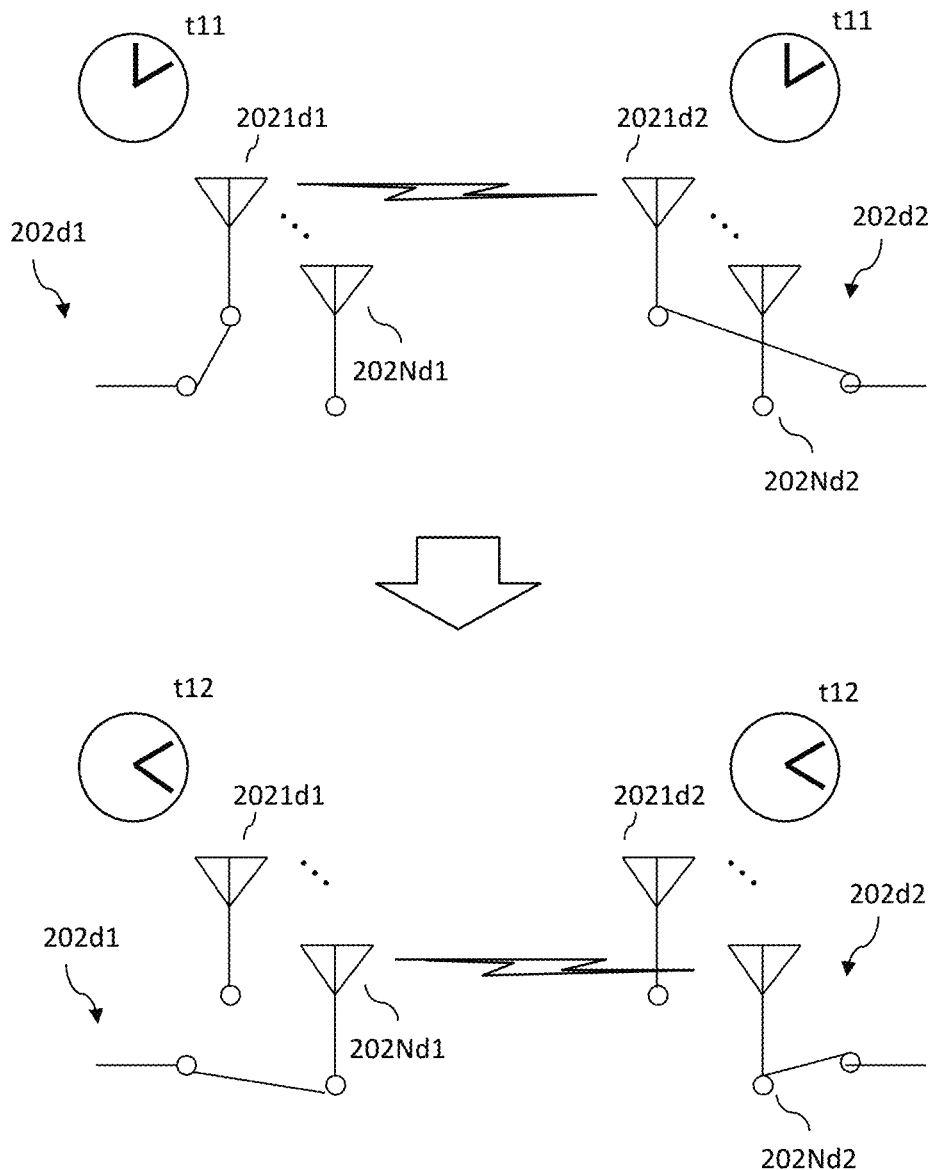
FIG. 20 is a diagram for explaining an example of communication between the wireless device 200$d$1 and the wireless device 202$d$2 when time synchronization is performed.

FIG. 20 is a diagram illustrating an example of communication between the wireless devices 200$d1$ and 200$d2$ when the time synchronization is performed. In the example of FIG. 20, the order of antenna switching for each time is determined in advance in the wireless devices 200$d1$ and 200$d2$. For example, at the time t11, the first electromagnetic wave is radiated from the wireless device 200$d1$ via the antenna 2021$d1$, and the wireless device 200$d2$ receives the first electromagnetic wave using the antenna 2021$d2$. The reception of the first electromagnetic wave is performed from the antenna 2022$d2$ to the antenna 202N$d2$, and then the second electromagnetic wave is radiated from the wireless device 200$d1$ via the antenna 2022$d1$, the wireless device 200$d2$ receives the second electromagnetic wave and repeats from the antenna 2021$d2$ to the antenna 202N$d2$. In this manner, when radiation of the Nth electromagnetic wave and reception by the antenna 202N$d2$ are completed at the time t12, a series of propagation data is measured for the communication between the wireless devices 200$d1$ and 200$d2$. Since the wireless devices 200$d1$ and 200$d2$ determine an order of antenna switching for each time, the transmission antenna identifier may be excluded from the transmission signal, or the reception antenna identifier may be excluded from the first communication information to the Nth communication information. When a frequency band to be used for communication is determined according to time, the frequency CH may be excluded from the first communication information to the Nth communication information. This is because the estimation apparatus 100 can recognize the combinations of the transmission antenna and the reception antenna and the frequency band used for communication when the order of switching the antennas and an order of switching the frequency CH for each time are acquired by the estimation apparatus 100. By reducing a capacity from the first communication information to the Nth communication information, it is possible to speed up the processing of the wireless devices 200 and simplify the wireless devices 200.

Figure 21:
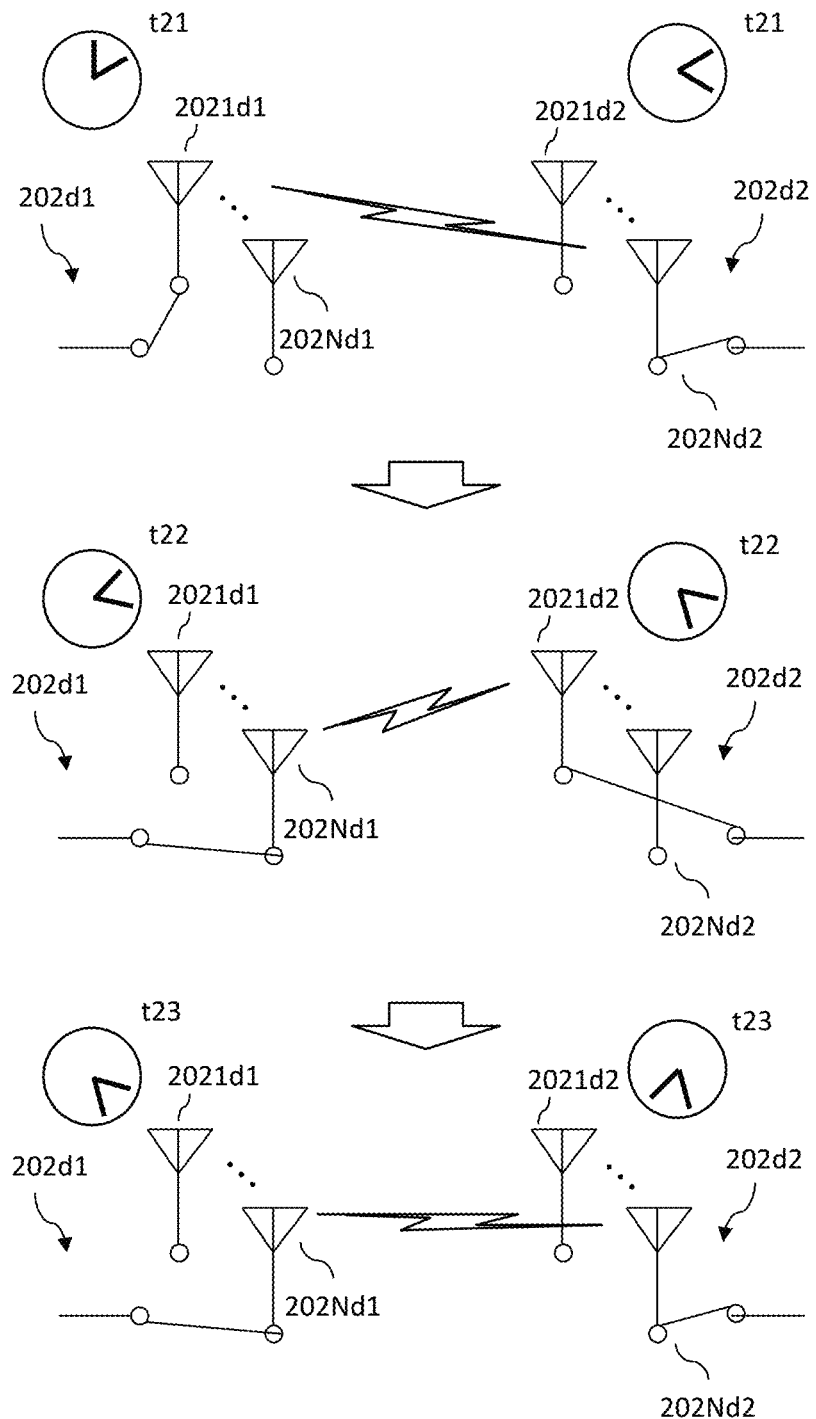
FIG. 21 is a diagram for explaining another example of communication between the wireless devices 200$d$1 and 202$d$2.

FIG. 21 is a diagram illustrating another example of communication between the wireless devices 200d1 and 202d2. In the example of FIG. 21, an order of switching of the antennas 202 for each time is not determined in the wireless devices 200d1 and 200d2, but the order is random. In this case, the transmission signal includes the frequency CH and the transmission antenna identifier, and from the first communication information to the Nth communication information include the reception antenna identifier. Even if the switching of the antennas 202 is random, by receiving from the first electromagnetic wave to the Nth electromagnetic wave for a long time, from the first communication information to the Nth communication information can be generated similar number of information. In the example of FIG. 21, at the time t21, the first electromagnetic wave is radiated from the antenna 2021d1 and is received using the antenna 202Nd2. At time t22, the Nth electromagnetic wave is radiated from the antenna 202Nd1 and received using the antenna 2021d2. At time t23, the Nth electromagnetic wave is radiated from the antenna 202Nd1 and received using the antenna 202Nd2. If the switching of the antennas 202 is random, it is not necessary to arrange the wireless device 200 on the transmission side and the wireless device 200 on the reception side, and it is possible to speed up processing of the wireless devices 200 and simplify the wireless devices 200.

(Modification 3)

In this modification, simplification of the communication information will be described. By omitting some of pieces of information included in the communication information, capacity of the communication information can be reduced. FIG. 22 is a diagram illustrating communication information in which the wireless device ID on the reception side is omitted in the wireless device 200dX. Since the communication information is generated by a wireless device 200 that receives the transmission signal and transmits to the estimation apparatus 100, the estimation apparatus 100 can recognize the wireless device 200 on the reception side by acquiring the communication information. The wireless device ID on the reception side may be added by the estimation apparatus 100 and may be omitted from the communication information. When the transmission antenna identifier is given in association with the transmission wireless device ID, the transmission wireless device ID or the transmission antenna identifier can be omitted.

FIG. 23 is a diagram illustrating communication information in which the transmission antenna identifier and the reception antenna identifier are further omitted from the case of FIG. 22. When the transmission antenna identifier and the reception antenna identifier exist, the data determiner 112 can determine the statistics for each category, and each combination of antennas as in the present embodiment, and thus it is possible to reduce the influence of the outlier. Even if the transmission antenna identifier and the reception antenna identifier are omitted for simplification, the data determiner 112 can determine the statistics S as the present embodiment.

FIG. 24 is a diagram illustrating communication information in which the frequency CH is further omitted from the case of FIG. 23. When the frequency CH exists, the data determiner 112 can determine the statistics for each category as in the present embodiment, and thus the influence of the outlier can be reduced. Even if the frequency CH is omitted for simplification, the data determiner 112 can determine the statistics S as the present embodiment.

FIG. 25 is a diagram illustrating communication information in which the transmission antenna identifier and the reception antenna identifier are omitted from the communication information according to the present embodiment. As in the case described with reference to FIG. 23, even if the transmission antenna identifier and the reception antenna identifier are omitted for simplification, the data determiner 112 can determine the statistics S as the present embodiment.

FIG. 26 is a diagram illustrating communication information in which the frequency CH is further omitted from the case of FIG. 25. As in the case described with reference to FIG. 24, even if the frequency CH is omitted for simplification, the data determiner 112 can determine the statistics S as the present embodiment.

FIG. 27 is a diagram illustrating a case where a part of the communication information is erased before outputting the communication information. Taking the first communication information in FIG. 27 as an example, the propagation data (the reception power) can be classified into categories of the transmission wireless device ID, the frequency CH, the transmission antenna identifier, and the reception antenna identifier. The data generator 211 may determine statistics of the propagation data for each category and erase data of the same category other than the determined statistics. In the case of FIG. 27, in the categories of the transmission wireless ID 200d1, the frequencies CH1, the transmission antenna identifiers 2021d1, and the reception antenna identifiers 2021dX, there are three types of reception power: −50 dBm, −45 dBm, and −52 dBm. The data generator 211 leaves only the statistic for which the reception power of the maximum value is −45 dBm as statistic in this category, and deletes other data in the same category. Capacity of the communication information can be reduced by the data generator 211 deleting a part of the communication information before the wireless device 200 transmits the communication information to the estimation apparatus 100.

(Modification 4)

Hereinafter, a modification in which the function of the estimation apparatus 100 is realized by a program will be described. The functions performed by the components of the estimation apparatus 100 may be realized by a processing device similar to the processor 110 processing a program. The program may be provided by being stored in a computer-readable storage medium such as a CD-ROM, a memory card, a CD-R, or a digital versatile disk (DVD) as a file in an installable format or an executable format. The program may be stored in a computer connected to a network such as the Internet and provided via the network, or may be provided by being incorporated in a storage medium such as a ROM, an HDD, or an SSD.

The modified example of the communication system 300 including the estimation apparatus 100 has been described above. The estimation apparatus 100 of the present embodiment acquires position candidate information, first communication information related to communication of a first electromagnetic wave between wireless devices 200, second communication information related to communication of a second electromagnetic wave between wireless devices 200, . . . , and Nth communication information related to communication of a Nth electromagnetic wave between wireless devices 200. The estimation apparatus 100 estimates positions of the wireless device 200 from the position candidates based on the position candidate information and the first communication information to the Nth communication information. By using communication information between the wireless devices 200 using a plurality of electromagnetic waves, the accuracy of estimation of the positions of the wireless devices 200 can be improved.

Second Embodiment

Figure 28:
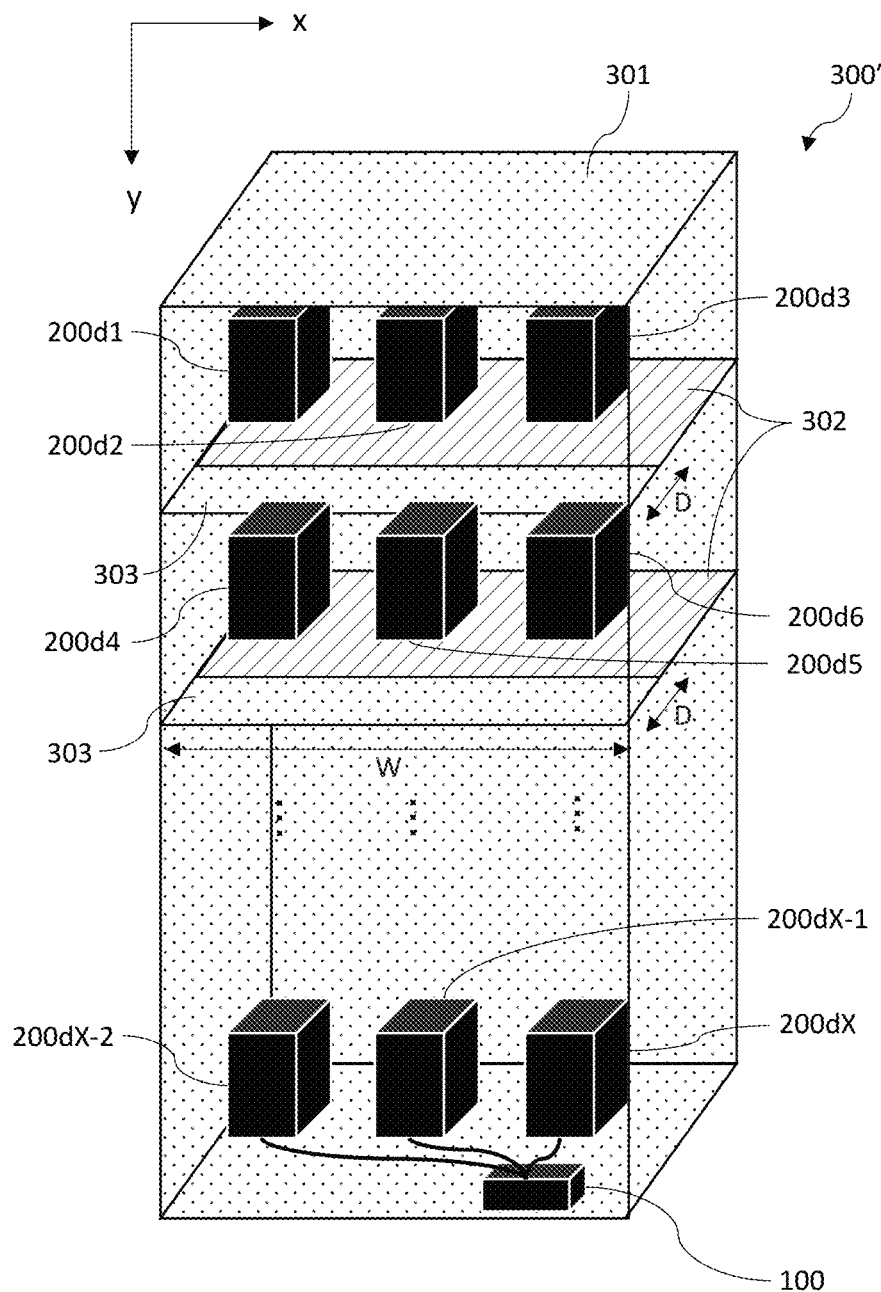
FIG. 28 is a configuration diagram of a communication system 300' according to the second embodiment.

In the second embodiment, an application example of the first embodiment will be described. FIG. 28 is a configuration diagram of a communication system 300' of an application example of the communication system 300. The communication system 300' includes the estimation apparatus 100, the wireless devices 200d1 to 200dX, a housing case 301, and shields 302. For an explanation, FIG. 28 visualizes the estimation apparatus 100, the wireless devices 200d1 to 200dX, and the shield 302, which are placed inside the housing case, through a part of the housing case. The wireless devices 200d1 to 200dX and the shield 302 are components to be provided inside the housing case 301. The estimation apparatus 100 is provided inside the housing case 301 in FIG. 28, the estimation apparatus 100 may be provided outside the housing case 301. A space 303 is between the housing case 301 and the shield 302. The estimation apparatus 100 and the wireless device 200 are connected to each other by a wire. In FIG. 28, a part of the connection between the estimation device 100 and the wireless devices 200 is omitted. The connection may be connected wirelessly.

Since the estimation apparatus 100 and the wireless devices 200d1 to 200dX are the same as those in the first embodiment, the estimation apparatus 100 and the wireless devices 200d1 to 200dX are denoted by the same reference numerals and description thereof will be omitted. The housing case 301 is a housing in which the wireless devices 200d1 to 200dX are provided. The housing case 301 may be made of any material. For example, a metal, a resin, or a hybrid material thereof may be used.

The shield 302 is provided inside the housing case 301 and supports the wireless devices 200. That is, the shield 302 provided in the housing case 301 serves as a shelf for supporting the wireless devices 200. Due to the shield 302, the wireless devices 200 provided on different shield 302 are not linearly visible to each other. The shield 302 may be made of any material. For example, a metal, a resin, or a hybrid material thereof may be used.

The space 303 is a region formed by the shields 302 provided inside the housing case 301 and the housing case 301. In FIG. 28, regions having a width W and a depth D is formed on surfaces including the shields 302. In other words, internal space of the housing case 301 is not completely partitioned by the shields 302, and there is the space 303 in a part thereof. At least a part of the first electromagnetic wave to the Nth electromagnetic wave used for communication by the wireless devices 200d1 to 200dX pass at different power by the space 303. In FIG. 28, the space 303 is space, it may be placed in a part of the shield 302. The space 303 may be an object instead of space. In this case, the material of the object is a material that passes electromagnetic waves more easily than the shield 302. Note that even in the case where the space 303 is placed in part of the shield 302, the space 303 is formed by the housing case 301 and the shield 302.

Figure 29:
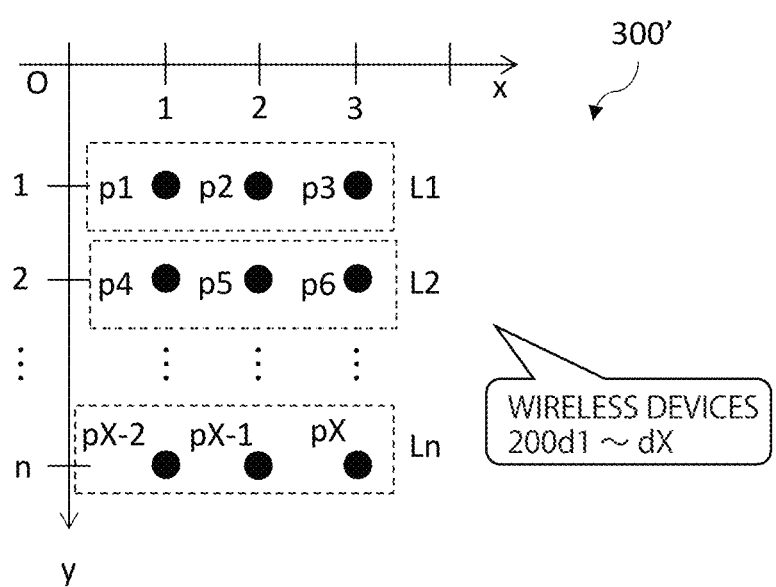
FIG. 29 is a diagram illustrating position candidates of wireless devices 200$d$1 to 200$d$X in the communication system 300'.

The components of the communication system 300' have been described above. FIG. 29 is a diagram illustrating position candidates of the wireless devices 200d1 to 200dX in the communication system 300'. In the present embodiment, internal space of the housing case 301 is partitioned by the shield 302. Hereinafter, this partitioned regions are referred to as layers. In the present embodiment, since the layers are set perpendicular to y coordinate, the position candidate can be classified for each layer. For example, the position candidates p1 to p3 are in layer L1, the position candidates p4 to p6 are in layer L2, . . . , and the position candidates pX-2 to pX are in layer Ln (n=X/3). In the present embodiment, it is assumed that the wireless device 200d1 is placed in the position candidate p1, the wireless device 200d2 is placed in the position candidate p2, . . . , and the wireless device 200pX is placed in the position candidate pX, but these are unknown to the estimation apparatus 100.

Figure 30:
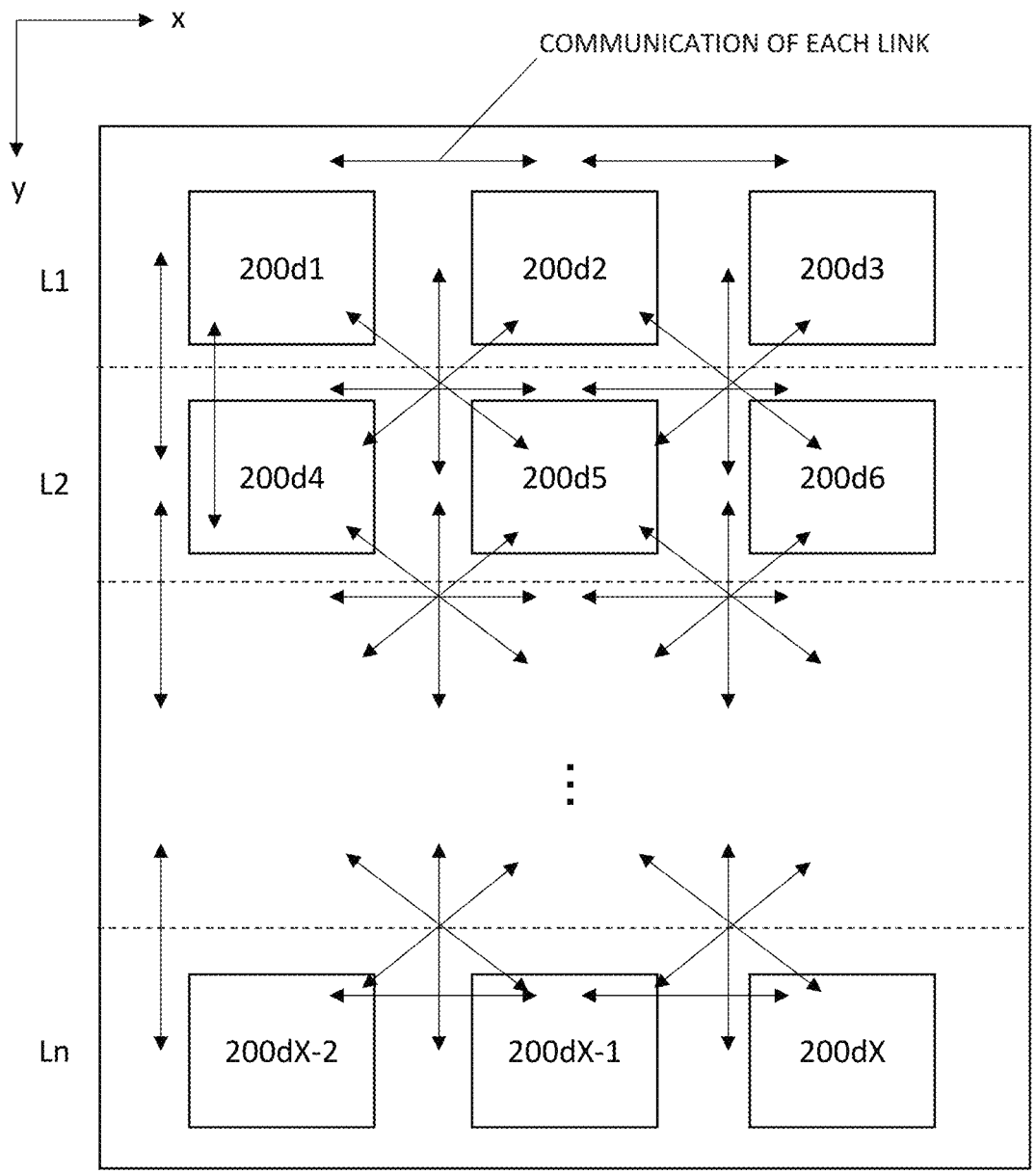
FIG. 30 is a schematic diagram of communication between wireless devices 200 in the second embodiment.

FIG. 30 is a schematic diagram of communication between wireless devices 200 in the present embodiment. As in the first embodiment, the wireless devices 200 perform communication in each combination and measure propagation data. Here, reception power of the electromagnetic wave in the communication of the wireless devices 200 varies depending on whether the wireless device 200 on the reception side receives the electromagnetic wave directly or receives the electromagnetic wave reflected by the housing case 301 or the shield 302. Hereinafter, an electromagnetic wave that is directly received is also referred to as a direct wave, and an electromagnetic wave that is received after being reflected by the housing case 301 or the shield 302 is also referred to as a reflected wave.

Figure 31:
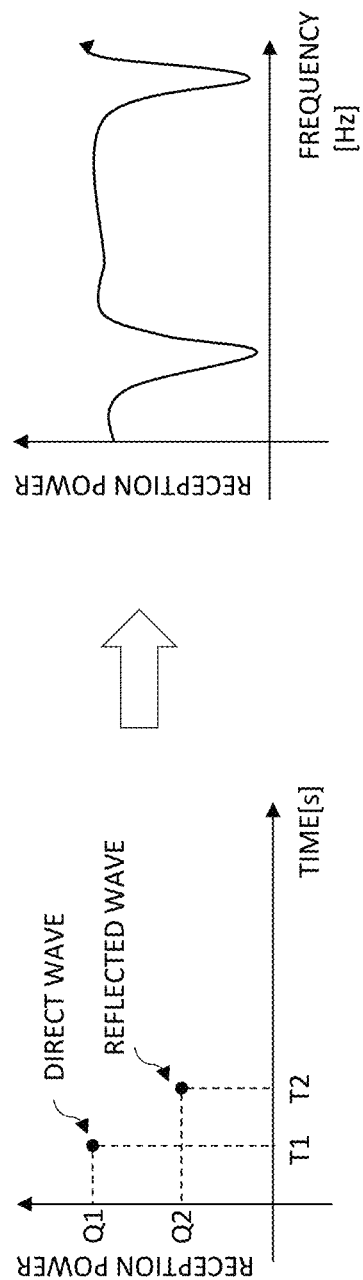
FIG. 31 is a diagram for explaining an influence of a mixture of a direct wave and a reflected wave.

In the communication system 300', the direct wave and the reflected wave are mixed. FIG. 31 is a diagram for explaining the influence of the mixture of the direct wave and the reflected wave. As described above, the reception power of the direct wave is higher than that of the reflected wave. In addition, since the reflected wave is received after being reflected by the housing case 301 or the shield 302, the path to the reception is longer than that of the direct wave. Therefore, the reflected wave is received later than the direct wave. In the diagram on the left side of FIG. 31, the direct wave is received at time T1 and reception power Q1 after the electromagnetic wave is radiated. On the other hand, the reflected wave is received at a time T2 and a reception power Q2 after the electromagnetic wave is radiated. The time T2 is longer than T1 and the reception power Q2 is smaller than Q1. When the direct wave and the reflected wave are mixed, the reflected wave may be combined with the direct wave in reverse phase or in phase. As a result, the reception power weakens or strengthens depending on the frequency, and accuracy of measurement of the propagation data decreases. The diagram on the right side of FIG. 31 illustrates an example in which the reception power differs depending on the frequency. As in the first embodiment, by using a plurality of electromagnetic waves for communication between the wireless devices 200 and determining statistics, it is possible to estimate the positions of the wireless devices 200 in consideration of the combinations of the direct wave and the reflected wave.

Figure 32:
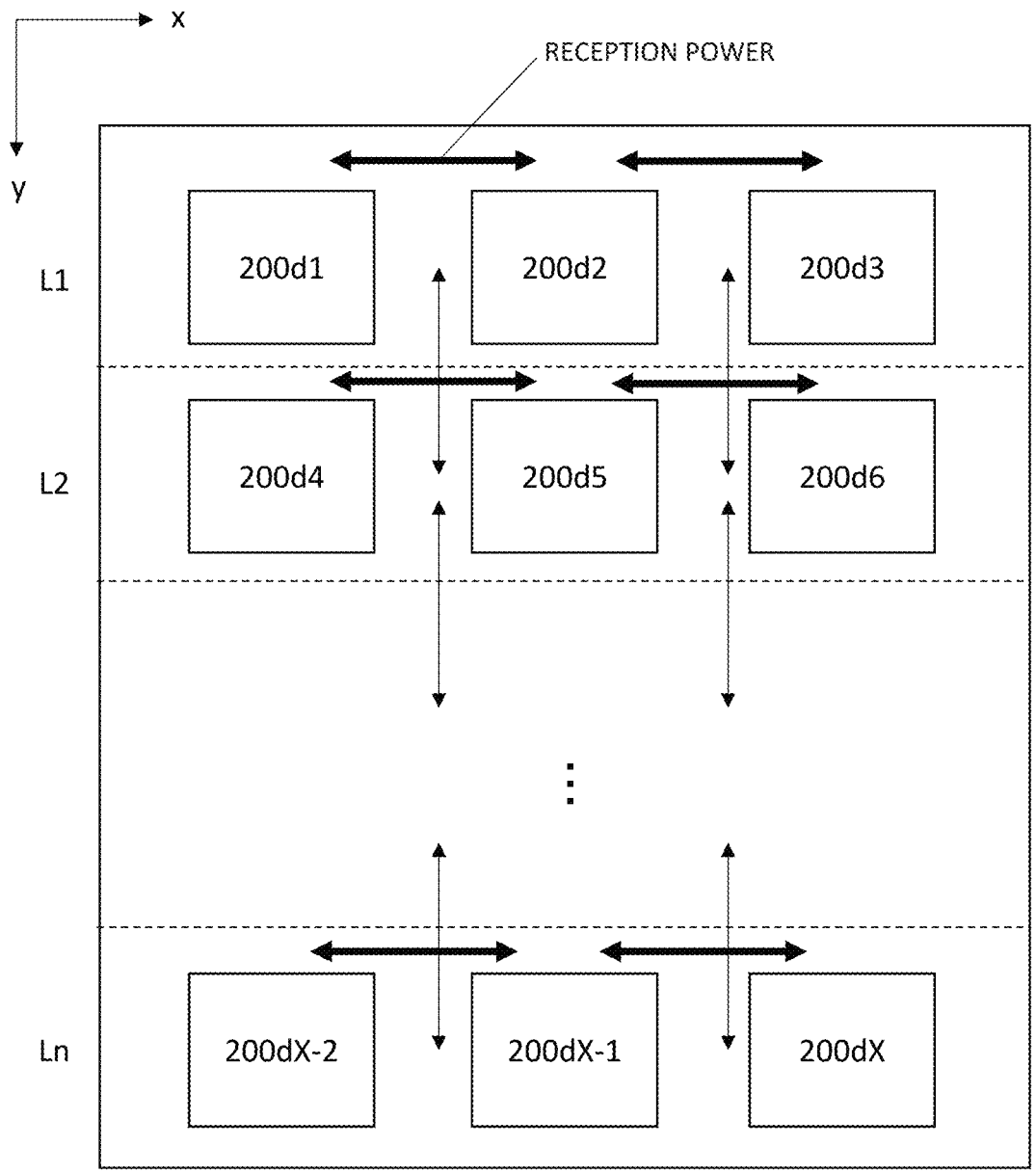
FIG. 32 is a diagram schematically illustrating reception power for each layer.

FIG. 32 is schematic diagram illustrating a reception power for each layer. The communication system 300' is divided into layers L1 to Ln by the housing case 301 and the shield 302. In FIG. 32, the reception power of communication is represented by thickness of an arrow. In the communication of the wireless devices 200 in different layers, although the electromagnetic wave pass by the space 303, since the electromagnetic wave is shielded by at least one of the shields 302, the reception power is smaller than that in the communication of the wireless devices 200 in the same layer. The estimation apparatus 100 of the present embodiment groups the wireless devices 200 for each layer by utilizing the fact that the reception power differs depending on the layer in which the wireless devices 200 placed. The estimation apparatus 100 estimates the position of the wireless devices 200 for each group. By using the communication information between the wireless devices 200 by the plurality of electromagnetic waves, the estimation apparatus 100 can improve accuracy of the estimation of the positions of the wireless devices 200. Further, by grouping the wireless devices 200, the estimation apparatus 100 can reduce an amount of calculation related to the estimation of the positions of the wireless devices 200 as compared a case where the wireless devices 200 are not grouped.

Figure 33:
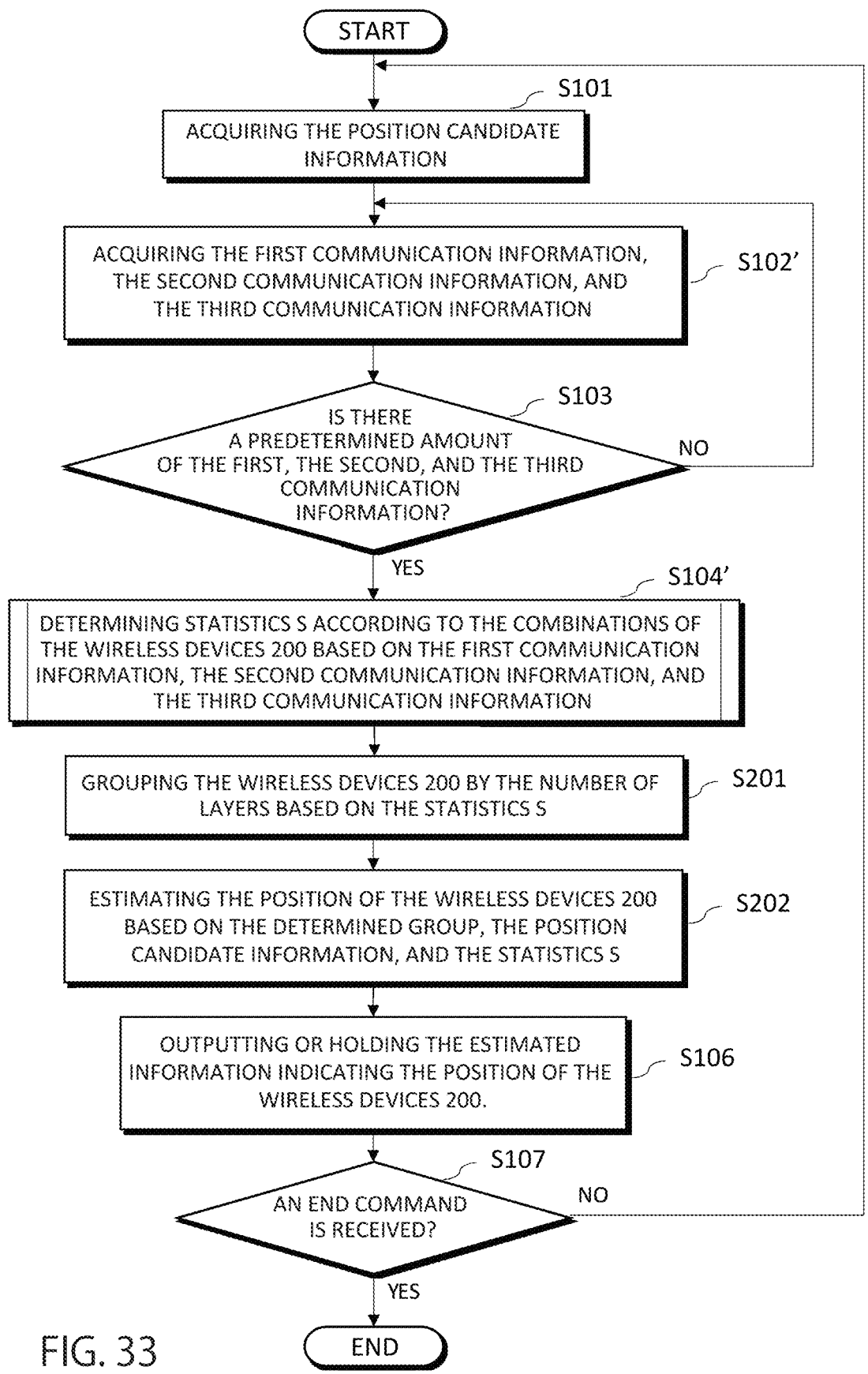
FIG. 33 is a flowchart of an estimation operation of the estimation apparatus 100 according to the second embodiment.

FIG. 33 is a flowchart of an estimation operation of the estimation apparatus 100 of the present embodiment. Since this flowchart is similar to the flowchart in FIG. 5, the same step numbers are assigned to the same steps, and a description thereof will be omitted, and differences between similar steps will be described. In the present embodiment, an example in which the first electromagnetic wave, the second electromagnetic wave, and the third electromagnetic wave are used for communication between the wireless devices 200 is described. Therefore, the same applies to cases of two electromagnetic waves or four or more electromagnetic waves. In the wireless device 200 on the transmission side, the first electromagnetic wave is radiated from the antenna 2021, the second electromagnetic wave is radiated from the antenna 2022, and the third electromagnetic wave is radiated from the antenna 2023.

In step S102', since three electromagnetic waves are used for the communication, the acquisition device 101 acquires the first communication information, the second communication information, and a third communication information. In step S104', since three electromagnetic waves are used for the communication, the data determiner 112 determines statistics S according to the combinations of the wireless devices 200 based on the first communication information, the second communication information, and the third communication information. In step S1041, there are eight categories classified by frequencies CH, transmission antenna identifiers, and reception antenna identifiers for each combination of wireless devices. However, since electromagnetic waves used for the communication increase, the number of transmission antennas and reception antennas increases, and the number of categories increases. As in the first embodiment, the data determiner 112 determines statistics S1 according to the category, determines statistics S2 according to the antenna of the wireless device 200 from the statistics S1, and determines the statistics S according to the combinations of the wireless devices 200 from the statistic S2.

After step S104', the estimator 113 groups the wireless devices 200 by the number of layers based on the statistics S (step S201). An example of grouping the wireless devices 200 based on the statistics S will be described.

In the example, two communication systems 300' of the present embodiment are used. Hereinafter, these communication systems are referred to communication system 300A and 300B. Twenty-three wireless devices 200 are included in each of the communication systems 300A and 300B. Serial numbers are assigned to the wireless devices 200 as wireless device IDs. Wireless devices 200 of the communication system 300A have wireless device IDs of 1 to 23 and wireless devices 200 of the communication system 300B have wireless device IDs of 24 to 46. Three wireless devices 200 are included in each layer, and two wireless devices 200 are included in one layer in each of the communication systems 300A and 300B. In the communication system 300A, wireless device IDs (1, 2), (3, 4, 5), . . . , and (21, 22, 23) are groups, and in the communication system 300B, wireless device IDs (24, 25), (26, 27, 28), . . . , and (44, 45, 46) are groups.

Figure 34:
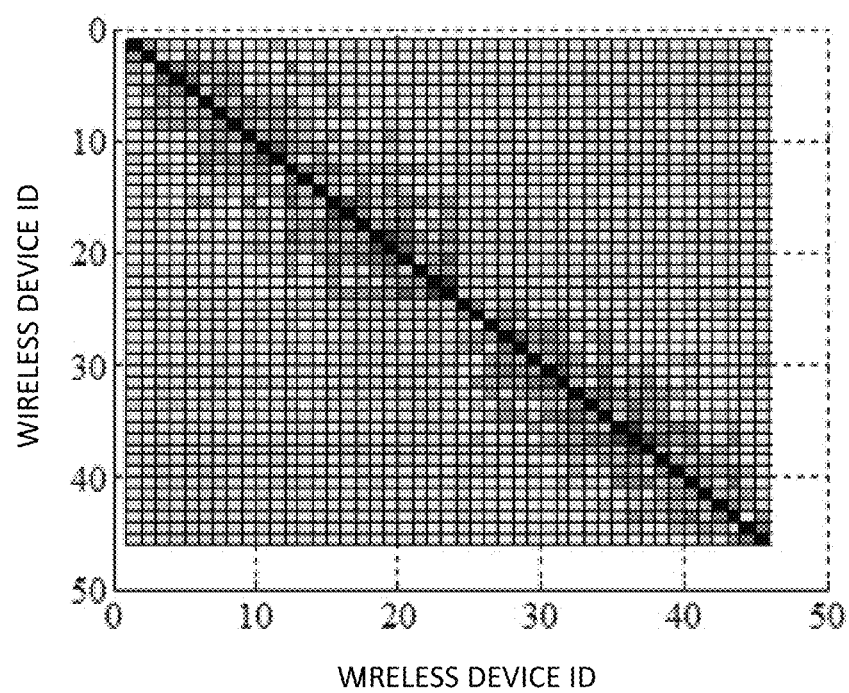
FIG. 34 is a diagram in which statistics of propagation data included in first communication information using a first electromagnetic wave between wireless devices 200 are mapped.
Figure 35:
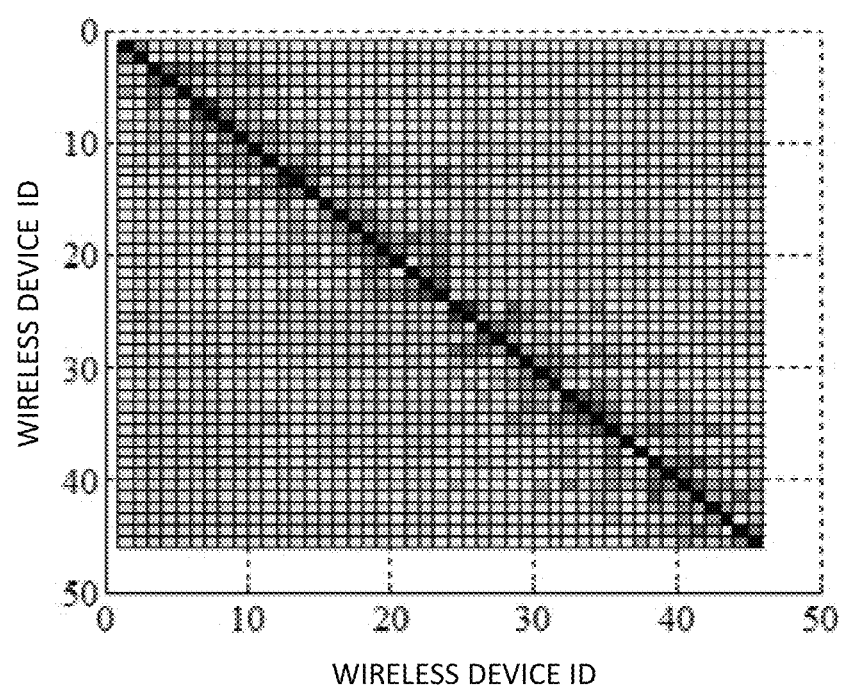
FIG. 35 is a diagram in which statistics of propagation data included in second communication information using a second electromagnetic wave between wireless devices 200 are mapped.
Figure 36:
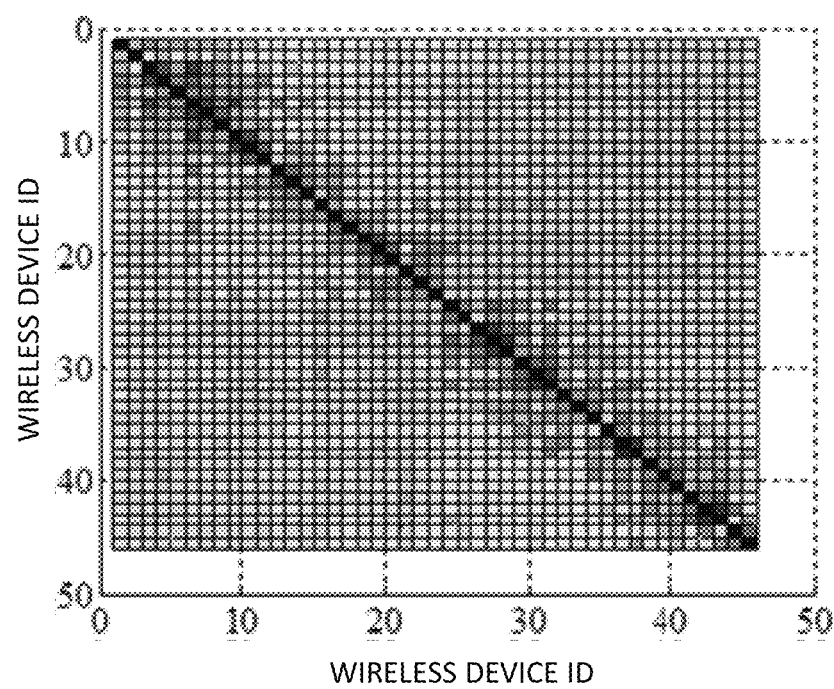
FIG. 36 is a diagram in which statistics of propagation data included in third communication information using a third electromagnetic wave between wireless devices 200 are mapped.
Figure 37:
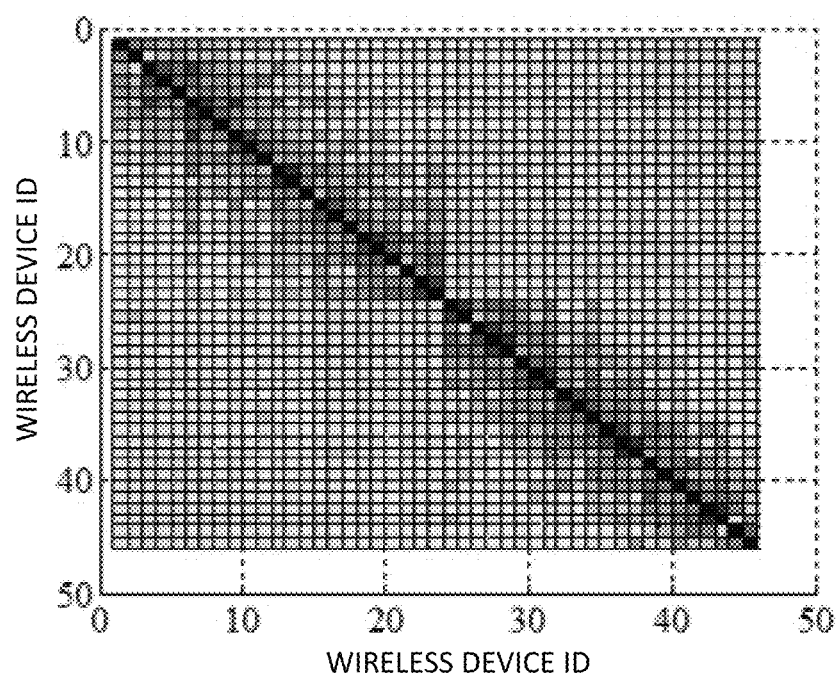
FIG. 37 is a diagram in which statistics determined from propagation data included in first communication information to third communication information using first electromagnetic waves to third electromagnetic waves are mapped.

FIG. 34 is a diagram in which statistics of the propagation data included in the first communication information using the first electromagnetic wave between wireless devices 200 are mapped. The darker the color, the larger the statistics. Since the communication of the same wireless device 200 is ignored, the mapping is painted black. In the example, the reception power is used as the propagation data, and maximum value is used as each statistic. FIG. 35 is a diagram in which statistics of the propagation data included in the second communication information using the second electromagnetic wave between the wireless devices 200 are mapped. FIG. 36 is a diagram in which the statistics of the propagation data included in the third communication information using the third electromagnetic wave between the wireless devices 200 are mapped. FIG. 37 is a diagram in which statistics for combinations of wireless devices 200 determined in the same manner as in the first embodiment are mapped from the propagation data included in the first communication information to the third communication information. In FIG. 37, as compared with FIG. 34 to FIG. 36, the statistics of the wireless devices 200 having close wireless device IDs are larger.

FIG. 38 is a diagram illustrating results of grouping based on propagation data of the first electromagnetic wave, the second electromagnetic wave, the third electromagnetic wave. The results of grouping based on the propagation data of only the first electromagnetic wave, the second electromagnetic wave, and the third electromagnetic wave are different from the actual group. A result of grouping based on the propagation data of the first electromagnetic wave to the third electromagnetic wave coincides with the actual group. Based on the propagation data of the first electromagnetic wave to the third electromagnetic wave, the estimation apparatus 100 can exclude the outlier of the propagation characteristic due to the electromagnetic wave, and can improve the accuracy of the grouping of the wireless devices 200 and the estimation of the position of the wireless devices 200 compared to a case of one electromagnetic wave used.

Figure 39:
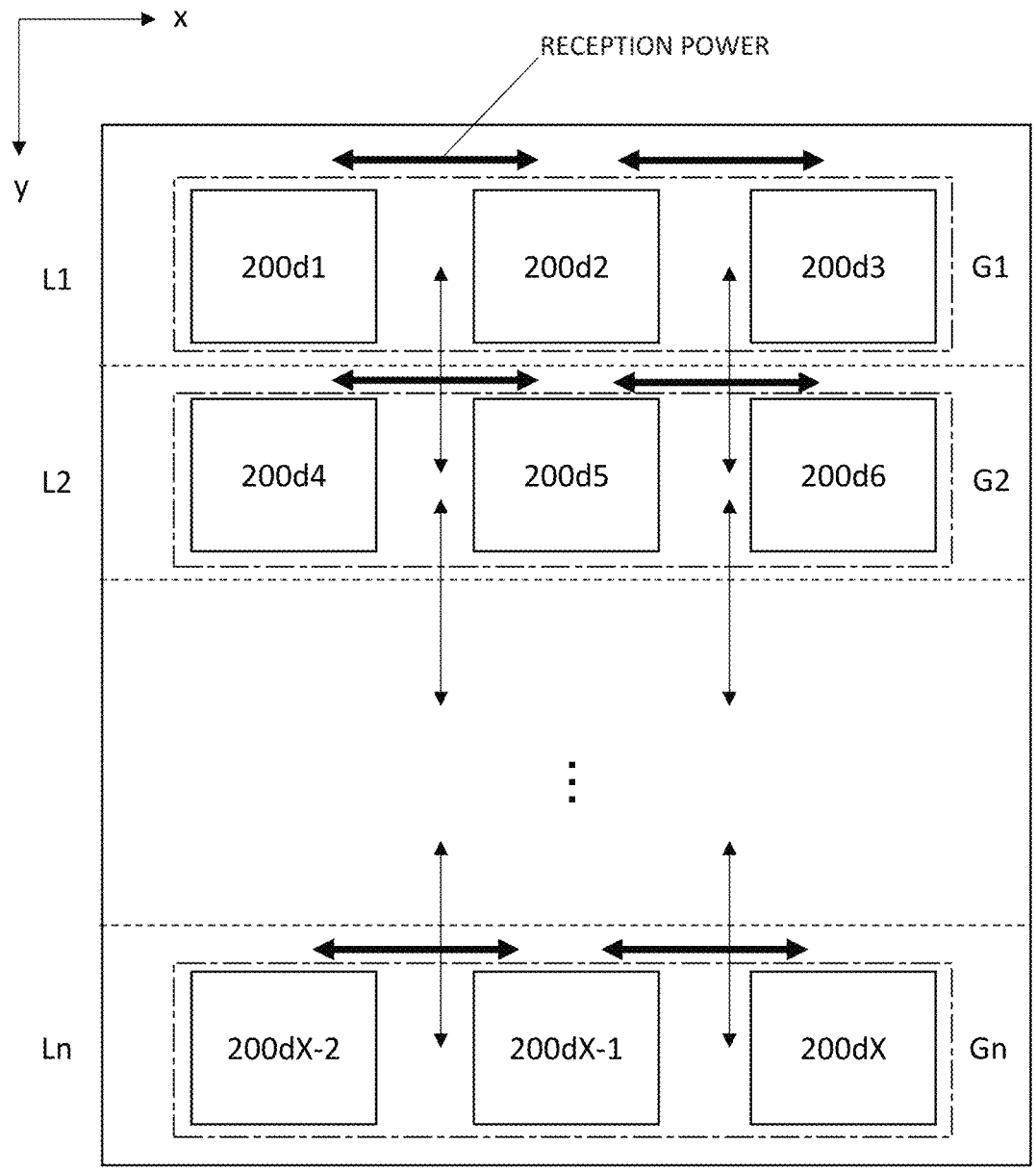
FIG. 39 is a diagram illustrating grouping according to the second embodiment.

FIG. 39 is a diagram illustrating the grouping according to the present embodiment. The estimator 113 divides the wireless devices 200$d$1 to 200$d$X into groups in the same manner as in the example. The estimator 113 determines the devices 200$d$1 to 200$d$3 as group G1, wireless devices 200$d$4 to 200$d$6 as group G2, . . . , wireless devices 200$d$X-2 to 200$d$X as group Gn, respectively.

Figure 40:
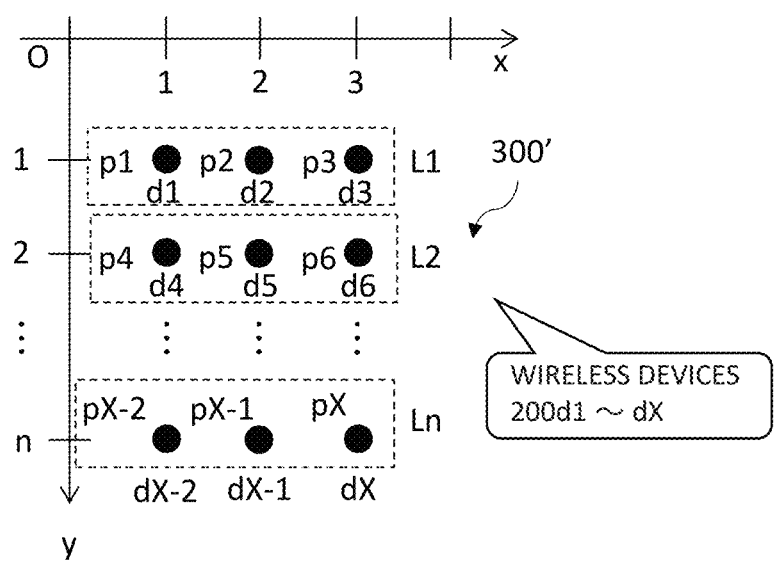
FIG. 40 is a diagram illustrating an example of the positions of the wireless devices 200 estimated by the estimator 113 in the second embodiment.

The description returns to the flowchart of FIG. 33. The estimator 113 estimates the position of the wireless devices 200 based on the determined group, the position candidate information, and the statistics S (step S202). The estimator 113 estimates the positions of the wireless devices 200$d$1 to 200$d$X in the similar manner as in the first embodiment. In the present embodiment, the estimator 113 tentatively arranges the groups G1 to Gn in the layers L1 to Ln, tentatively arranges the wireless devices 200 included in the groups as the position candidates included in the layers, and generates hypotheses. The estimator 113 calculates an evaluated value for each hypothesis, and estimates a combination most appropriate as the placement of the wireless devices 200$d$1 to 200$d$X as the position of the wireless devices 200. FIG. 40 is a diagram illustrating an example of the positions of the wireless devices 200 estimated by the estimator 113. As an example of the present embodiment, the estimator 113 estimates that the wireless device 200$d$1 is placed at the position candidate p1, the wireless device 200d2 is placed at the position candidate p2, . . . , and the wireless device 200dX is placed at the position candidate pX.

Steps S106 and S107 are the same as those in the first embodiment. In step S106, information indicating the positions of the wireless devices 200 may be output or stored for each group, or information indicating the groups G1 to Gn or the layer L1 to Ln determined by the estimator 113 may be output or stored.

The estimation apparatus 100 according to the present embodiment has been described above. The estimation apparatus 100 described in the present embodiment is an example, and various modifications can be implemented and executed. For example, the modification described in the first embodiment is also applicable to the present embodiment. Hereinafter, a modified example of the communication system 300' including the estimation apparatus 100 will be described.

(Modification 5)

Figure 41:
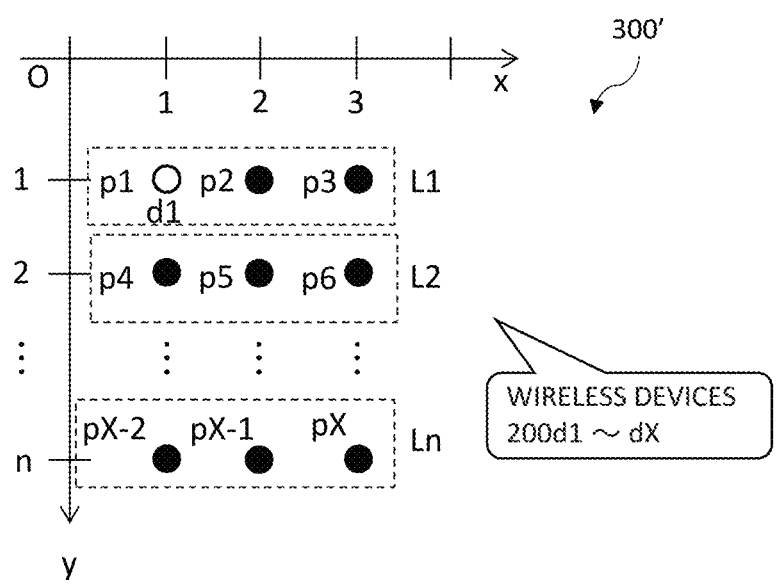
FIG. 41 is a diagram for explaining known information indicating that the wireless device 200d1 is placed in a position candidate p1.

In this modification, the accuracy of estimation of the position of the wireless devices 200 is improved, and an amount of calculation for the estimation is reduced. The acquisition device 101 further acquires information indicating the position of at least one wireless device 200 among the wireless devices 200d1 to 200dX (hereinafter also referred to as known information). FIG. 41 is a diagram illustrating the known information indicating that the wireless device 200d1 is placed in the position candidate p1 as an example of the present modification. The estimator 113 estimates the positions of the wireless devices 200d2 to 200dX from the position candidates p2 to pX further based on the known information. In this way, when the wireless devices 200d1 to 200dX are regularly placed, the estimation apparatus 100 can exclude a case of point symmetry or rotational symmetry. Therefore, the estimation apparatus 100 can improve the accuracy of the estimation of the positions of the wireless devices 200 and reduce the amount of calculation for the estimation. This modification can also be applied to the first embodiment.

The modified example of the communication system 300' including the estimation apparatus 100 has been described above. The estimation apparatus 100 of the present embodiment acquires the position candidate information, the first communication information related to communication of the first electromagnetic wave between the wireless devices 200, the second communication information related to communication of the second electromagnetic wave between the wireless devices 200, . . . , and the Nth communication information related to communication of the Nth electromagnetic wave between the wireless devices 200. The estimation apparatus 100 estimates the position of the wireless devices 200 from the position candidates based on the position candidate information and the first communication information to the Nth communication information. Even in an example in which the wireless devices 200d1 to 200dX are placed on shelfs formed by the housing case 301 and the shield 302, the estimation apparatus 100 of the present embodiment can improve the accuracy of the estimation of the positions of the wireless devices 200 by using communication information between the wireless devices 200 by the plurality of electromagnetic waves.

In addition, by grouping the wireless devices 200d1 to 200dX, the estimation apparatus 100 according to the present embodiment can reduce the amount of calculation for the estimation compared to a case in which estimation is performed without grouping. Since the communication system 300' includes X position candidates and X wireless devices 200, it is necessary to estimate the most appropriate combination from X! combinations in a case of estimating the positions of the wireless devices 200 without dividing into groups. In a case of dividing into X/3 (n) groups by three wireless devices 200 as in the present embodiment, the estimation apparatus 100 can determine the most appropriate combination from $3!^{(x/3)}$ combinations, and reduce the amount of calculation for the estimation. The reduction in the amount of calculation can reduce estimation time and improve the estimation accuracy in a certain estimation time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising:
a processor configured to estimate positions of a plurality of wireless devices from a plurality of position candidates based on
position candidate information indicating the plurality of position candidates of the wireless devices,
a first value based on a plurality of first propagation data obtained through a plurality of communications using a first electromagnetic wave between two wireless devices included in the plurality of wireless devices, and
a second value based on a plurality of second propagation data obtained through a plurality of communications using a second electromagnetic wave between the two wireless devices included in the plurality of wireless devices, wherein
the first value is one of a maximum, a minimum, an average, and a median value of the first propagation data obtained through the plurality of communications, and
the second value is one of a maximum, a minimum, an average, and a median value of the second propagation data obtained through the plurality of communications.

2. The electronic apparatus according to claim 1, wherein the first value is based on the plurality of first propagation data obtained through the plurality of communications using the first electromagnetic wave between two antennas of the two wireless devices included in the plurality of wireless devices and
the second value is based on the plurality of second propagation data obtained through the plurality of communications using the second electromagnetic wave between the two antennas of the two wireless devices in the plurality of wireless devices.

3. The electronic apparatus according to claim 1, wherein the processor is configured to determine a group including a part of the plurality of wireless devices based on the first value and the second value.

4. The electronic apparatus according to claim 3, wherein the processor estimates, after estimating a position of the group, based on the position candidate information, estimate positions of a plurality of wireless devices included in the group from the plurality of position candidates.

5. The electronic apparatus according to claim 1, wherein the first propagation data indicates at least one of a first reception power, a first signal-to-noise ratio, or a first error rate in communication using the first electromagnetic wave between the plurality of wireless devices, and
the second propagation data indicates at least one of a second reception power, a second signal-to-noise ratio, or a second error rate in communication using the second electromagnetic wave between the plurality of wireless devices.

6. The electronic apparatus according to claim 1,
the first value is based on the plurality of first propagation data obtained through the plurality of communications using the first electromagnetic wave of a single frequency between two wireless devices included in the plurality of wireless devices, and
the second value is based on the plurality of propagation data obtained through the plurality of communications using the second electromagnetic wave of a single frequency between two wireless devices included in the plurality of wireless devices.

7. An electronic apparatus comprising:
a processor configured to estimate positions of a plurality of wireless devices from a plurality of position candidates based on position candidate information indicating the plurality of position candidates of the wireless devices, first communication information related to communication using a first electromagnetic wave between the plurality of wireless devices, and second communication information related to communication using a second electromagnetic wave between the plurality of wireless devices,
wherein the first communication information and the second communication information include first identification information of a wireless device on a transmission side and second identification information of a wireless device on a reception side in communication between the plurality of wireless devices, and
the processor is configured to estimate the positions of the plurality of wireless devices from the plurality of position candidates based on the first identification information and the second identification information.

8. An electronic apparatus comprising:
a processor configured to estimate positions of a plurality of wireless devices from a plurality of position candidates based on position candidate information indicating the plurality of position candidates of the wireless devices, first communication information related to communication using a first electromagnetic wave between the plurality of wireless devices, and second communication information related to communication using a second electromagnetic wave between the plurality of wireless devices,
wherein the first communication information includes identification information of a first antenna used by a wireless device that transmits the first electromagnetic wave and identification information of a second antenna used by a wireless device that receives the first electromagnetic wave, and
the second communication information includes identification information of a third antenna used by the wireless device that transmits the second electromagnetic wave and identification information of a fourth antenna used by the wireless device that receives the second electromagnetic wave, and
the processor is configured to estimate the positions of the plurality of wireless devices from the plurality of position candidates based on the identification information of the first antenna, the identification information of the second antenna, the identification information of the third antenna, and the identification information of the fourth antenna.

9. An electronic apparatus comprising:
a processor configured to estimate positions of a plurality of wireless devices from a plurality of position candidates based on position candidate information indicating the plurality of position candidates of the wireless devices, first communication information related to communication using a first electromagnetic wave between the plurality of wireless devices, and second communication information related to communication using a second electromagnetic wave between the plurality of wireless devices,
wherein the first communication information includes first propagation data,
the second communication information includes second propagation data
the processor is configured to classify the first propagation data and the second propagation data, based on at least one of a wireless device on a transmission side, a wireless device on a reception side, an antenna used for the communication by the wireless device on the transmission side, an antenna used for the communication by the wireless device on the reception side, and a frequency band used for the communication in the communication between the plurality of wireless devices.

10. The electronic apparatus according to claim 9, further comprising
a storage to store the first communication information and the second communication information, wherein
the processor is configured to cause the storage to hold the classified first propagation data and the classified second propagation data.

11. An electronic apparatus comprising:
a processor configured to estimate positions of a plurality of wireless devices from a plurality of position candidates based on position candidate information indicating the plurality of position candidates of the wireless devices, first communication information related to communication using a first electromagnetic wave between the plurality of wireless devices, and second communication information related to communication using a second electromagnetic wave between the plurality of wireless devices,
wherein the first electromagnetic wave and the second electromagnetic wave are transmitted at different times.

12. An electronic apparatus comprising:
a processor configured to estimate positions of a plurality of wireless devices from a plurality of position candidates based on position candidate information indicating the plurality of position candidates of the wireless devices, first communication information related to communication using a first electromagnetic wave between the plurality of wireless devices, and second communication information related to communication using a second electromagnetic wave between the plurality of wireless devices, wherein polarization planes of the first electromagnetic wave and the second electromagnetic wave are orthogonal to each other.

13. The electronic apparatus according to claim 12, wherein
the first communication information includes first frequency information indicating a frequency band of the first electromagnetic wave, and
the second communication information includes second frequency information indicating a frequency band of the second electromagnetic wave, and
the processor is configured to estimate the positions of the plurality of wireless devices from the plurality of position candidates based on the first frequency information and the second frequency information.

14. The electronic apparatus according to claim 12, further comprising
an output device to output the estimated positions of the plurality of wireless devices.

15. An electronic system comprising:
a plurality of wireless devices; and
the electronic apparatus according to claim 12.

16. An electronic system comprising:
a housing case;
a first wireless device to be provided in the housing case and perform communication using a first electromagnetic wave and a second electromagnetic wave;
a second wireless device to be provided in the housing case and communicate with the first wireless device using the first electromagnetic wave and the second electromagnetic wave;
an electronic apparatus configured to estimate positions of the first wireless device and the second wireless device from a plurality of position candidates; and
a shield to be provided between the first wireless device and the second wireless device in the housing case; wherein
a space between the housing case and the shield makes the first electromagnetic wave and the second electromagnetic wave pass at different electric powers.

17. A method executed by a processor, comprising:
estimating positions of a plurality of wireless devices from a plurality of position candidates based on position candidate information indicating the plurality of position candidates of the wireless devices, first communication information related to communication using a first electromagnetic wave between the plurality of wireless devices, and second communication information related to communication using a second electromagnetic wave between the plurality of wireless devices,
wherein polarization planes of the first electromagnetic wave and the second electromagnetic wave are orthogonal to each other.

18. The method according to claim 17, further comprising:
acquiring the position candidate information, the first communication information and the second communication information.

* * * * *